United States Patent
Kojima et al.

(10) Patent No.: US 6,799,560 B2
(45) Date of Patent: Oct. 5, 2004

(54) FUEL INJECTION AMOUNT CONTROL APPARATUS AND METHOD OF INTERNAL COMBUSTION ENGINE

(75) Inventors: Kazunori Kojima, Toyota (JP); Junichi Kako, Susono (JP); Koichi Ueda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/676,157

(22) Filed: Oct. 2, 2003

(65) Prior Publication Data

US 2004/0079342 A1 Apr. 29, 2004

(30) Foreign Application Priority Data

Oct. 25, 2002 (JP) ........................................ 2002-310649

(51) Int. Cl.[7] .............................................. F02M 23/12
(52) U.S. Cl. ...................................................... 123/491
(58) Field of Search ................................. 123/491, 685

(56) References Cited

U.S. PATENT DOCUMENTS

| | | | | |
|---|---|---|---|---|
| 5,492,101 A | * | 2/1996 | Saito et al. ................. | 123/491 |
| 5,642,722 A | * | 7/1997 | Schumacher et al. ....... | 123/673 |
| 5,819,714 A | * | 10/1998 | Bush et al. ................. | 123/673 |
| 6,240,912 B1 | * | 6/2001 | Stanglmaier et al. ....... | 123/670 |
| 2001/0032637 A1 | * | 10/2001 | Grieve et al. ............... | 123/674 |

FOREIGN PATENT DOCUMENTS

| JP | B2 2606226 | 2/1997 |
|---|---|---|
| JP | B2 2754744 | 3/1998 |

* cited by examiner

Primary Examiner—Erick Solis
(74) Attorney, Agent, or Firm—Oliff & Berridge, PLC

(57) ABSTRACT

A fuel injection amount control apparatus of an internal combustion engine is arranged to start injection of a fuel into an intake passage of the engine when a certain engine start condition is satisfied, and stop the injection of the fuel when a certain engine stop condition is satisfied. The control apparatus estimates an amount of fuel deposited on an intake passage forming member that defines the intake passage, and determines a fuel injection amount based on the estimated fuel deposition amount. The control apparatus also executes a particular process for making an actual fuel deposition amount on the intake passage forming member substantially equal to zero, after the engine stop condition is satisfied and before the injection of the fuel is started under a condition that the engine start condition is satisfied.

20 Claims, 17 Drawing Sheets

FUEL INJECTION AMOUNT CONTROL APPARATUS AND METHOD OF INTERNAL COMBUSTION ENGINE

INCORPORATION BY REFERENCE

The disclosure of Japanese Patent Application No. 2002-310649 filed on Oct. 25, 2002, including the specification, drawings and abstract, is incorporated herein by reference in its entirety.

BACKGROUND OF THE INVENTION

1. Field of the Invention

The invention relates to fuel injection amount control apparatus and method of an internal combustion engine, and particularly relates to such fuel injection amount control apparatus and method that estimates an amount of fuel deposited on an intake system of the engine, and determines a fuel injection amount depending upon the estimated fuel deposition amount.

2. Description of Related Art

A known example of the above type of the fuel injection amount control apparatus is disclosed in, for example, Japanese Patent No. 2606226. The fuel injection amount control apparatus disclosed in this publication is adapted to estimate an amount of fuel deposited on a wall of an intake passage, based on a fuel behavior simulation model (or a fuel deposition model), and determine an amount of fuel to be injected, depending upon at least the estimated fuel deposition amount.

Also, after the engine stops rotating, the control apparatus disclosed in the above-identified publication estimates an evaporation speed or rate of the fuel deposited on the wall of the intake passage during a stop of the engine, and estimates the amount of fuel deposited on the intake passage wall during the stop of the engine, based on the estimated evaporation speed. Upon a re-start of the engine, the control apparatus sets the fuel deposition amount estimated during the stop of the engine, as an initial value of the fuel deposition amount used by the above-indicated fuel behavior simulation model. Thus, the control apparatus is able to estimate, with high accuracy, the amount of fuel deposited on the intake passage wall at the time of the re-start of the engine.

The above-identified publication (JP-B2-2606226) discloses that the estimated evaporation speed is a function of the intake passage wall temperature only, but does not disclose a specific method for accurately estimate the evaporation speed. Also, the fuel deposition amount on the intake passage wall, which is estimated by the apparatus during a stop of the engine, does not necessarily coincide with the actual fuel deposition amount on the intake passage wall.

Accordingly, the above-described control apparatus may suffer from reduced accuracy with which the fuel deposition amount is estimated at the time of a re-start of the engine. In this case, the amount of fuel injected during re-starting of the engine cannot be determined to be an appropriate amount. Consequently, the air/fuel ratio of the engine cannot be set to a target air/fuel ratio, which may result in deterioration of starting characteristics (such as ease of starting) at the time of the re-start of the engine, and an increase in the amount of emissions from the engine.

SUMMARY OF THE INVENTION

It is therefore an object of the invention to provide fuel injection amount control apparatus and method of an internal combustion engine, which are able to more appropriately determine the fuel injection amount upon a re-start of the engine.

To accomplish the above object, there is provided according to one aspect of the invention a fuel injection amount control apparatus of an internal combustion engine, which is arranged to start injection of a fuel when a certain engine start condition is satisfied, and stop the injection of the fuel when a certain engine stop condition is satisfied, which apparatus comprises: (a) a fuel injecting unit that injects the fuel in an intake passage that is connected to a combustion chamber of the engine; (b) a fuel deposition amount estimating unit that estimates a fuel deposition amount that is an amount of fuel deposited on an intake passage forming member that defines the intake passage; (c) a fuel injection amount determining unit that determines a fuel injection amount that is an amount of fuel injected from the fuel injecting unit, based on the estimated fuel deposition amount; and (d) a particular process executing unit that executes a particular process for making an actual fuel deposition amount on the intake passage forming member substantially equal to zero, after the engine stop condition is satisfied and before the injection of the fuel is started under a condition that the engine start condition is satisfied.

Here, the "the intake passage forming member" may include an intake pipe (including an intake manifold), an intake valve (in particular, a back face of the intake valve), an intake control valve, such as SCV, disposed in the intake passage. The actual fuel deposition amount is made equal to "substantially zero" not only when the amount is exactly equal to zero but also when the amount is equal to a certain non-zero value. The non-zero value may be determined such that a difference between the fuel injection amount determined by the fuel injection amount determining unit in the case where the fuel deposition amount is equal to the non-zero value and the fuel injection amount determined in the case where the fuel deposition amount is equal to zero is sufficiently small, and a target (desired) air/fuel ratio can be substantially achieved even if the non-zero value is treated as zero.

The "engine start condition is satisfied", for example, when the driver operates an ignition switch from ON to START while the engine is being stopped, or when a vehicle in which control is performed for effecting or stopping injection of fuel depending upon the running conditions of the vehicle after a start of the engine shifts from an operating state in which the control for stopping fuel injection is executed to an operating state in which the control for effecting fuel injection is executed. Such a vehicle may be, for example, a so-called hybrid vehicle provided with an internal combustion engine and other power source(s), such as an electric motor, or a vehicle that is provided with an internal combustion engine as a single power source and performs control for effecting or stopping injection of fuel depending upon the running conditions for the sake of reduction of energy consumption. Similarly, the "engine stop condition is satisfied", for example, when the driver operates the ignition switch from ON to OFF while the engine is being operated with fuel injected, or when the vehicle in which control is performed for effecting or stopping injection of fuel depending upon the running conditions of the vehicle after a start of the engine shifts from an operating state in which the control for effecting fuel injection is executed to an operating state in which the control for stopping fuel injection is executed.

With the control apparatus as described above, after a certain engine stop condition is satisfied and before injection of fuel is started under a condition that a certain engine start condition is satisfied (i.e., during a stop of the engine), the actual amount of fuel deposited on the intake passage forming member is made substantially equal to zero. Accordingly, upon a start of the injection of the fuel with the engine start condition satisfied (i.e., upon a re-start of the engine), if the fuel deposition amount estimating unit is arranged to start estimation of the fuel deposition amount in a condition that the initial value of the fuel deposition amount estimated by the fuel deposition amount estimating unit is set to zero (or a certain value in the case where a certain amount of fuel is injected by the fuel injecting unit during a stop of the engine), the estimated and actual values of the fuel deposition amount on the intake passage forming member obtained at the time of the re-start of the engine can be surely made substantially equal to each other. As a result, the fuel injection amount for the time of a re-start of the engine can be determined to be an appropriate value, to thereby provide a target air/fuel ratio, thus assuring improved starting characteristics of the engine upon the re-start of the engine and a reduction in the amount of emissions from the engine.

The fuel injection amount control apparatus may include a motoring unit capable of executing motoring of the internal combustion engine. In this case, the above-indicated particular process executing unit preferably causes the motoring unit to execute motoring of the engine as the particular process. Furthermore, in this case, the particular process executing unit preferably causes the fuel deposition estimating unit to estimate the fuel deposition amount on the intake passage forming member while the motoring unit is executing motoring of the engine, and causes the motoring unit to stop motoring of the engine when the estimated fuel deposition amount becomes substantially equal to zero.

When motoring of the engine is carried out, air flows into the intake passage of the engine, and the fuel deposited on the intake passage forming member is released from the intake passage forming member due to the air flow, and is drawn into the cylinder (i.e., the combustion chamber). As a result, the fuel deposition amount on the intake passage forming member decreases with time, and becomes substantially equal to zero when a certain period of time elapses.

Accordingly, with the control apparatus provided with the motoring unit for effecting motoring of the engine as described above, if the motoring unit is arranged to execute motoring of the engine during a stop of the engine, only a simple arrangement is needed for making the actual fuel deposition amount substantially equal to zero prior to a re-start of the engine, without requiring an additional device exclusively provided for executing the particular process, namely, for making the actual fuel deposition amount substantially equal to zero.

In the control apparatus provided with the motoring unit for effecting motoring of the engine as described above, the particular process executing unit preferably causes the motoring unit to execute motoring of the engine immediately after the engine stop condition is satisfied.

Generally, a catalyst, such as a three-way catalyst, is provided in the exhaust passage of the engine for removing or reducing harmful components contained in exhaust gases. The catalyst performs a good exhaust purifying or emission control function while it is in a warmed-up state. At a point of time when the engine stop condition is satisfied, the engine is often warmed up after a continuous operation thereof for a certain period of time up to the present time, and therefore the catalyst is often warmed up.

Accordingly, if the motoring unit is arranged to execute motoring of the engine immediately after the engine stop condition is satisfied, motoring of the engine is carried out while the catalyst is in the warmed-up state. Thus, when exhaust gas containing unburned components, such as HC and CO, of the fuel released from the intake passage forming member during execution of motoring flows into the catalyst, the unburned components can be favorably removed or treated by the catalyst, resulting in a reduction in the amount of emissions during execution of motoring.

In the case where the particular process executing unit is arranged to cause the motoring unit to execute motoring of the engine, and where the engine is provided with an introduction passage through which a part of exhaust gas that passes the exhaust passage of the engine is introduced into the intake passage (namely, where the engine is provided with a so-called EGR system), the particular process executing means preferably introduces the part of the exhaust gas into the intake passage through the introduction passage when the motoring unit executes motoring of the engine.

The air flowing through the intake passage and the fuel released from the intake passage forming member during execution of motoring flow into a combustion chamber defined by a cylinder, a piston and the like that have already been warmed up, so that the air and the fuel are warmed by heat of the cylinder, piston and the like, to thus provide exhaust gas that subsequently passes through the exhaust passage. Accordingly, if a part of the exhaust gas is introduced into the intake passage through the introduction passage during execution of motoring, the temperature of the intake air (a mixture of the air and the exhaust gas) passing over the fuel deposited on the intake passage forming member is elevated.

Consequently, evaporation of the fuel deposited on the intake passage forming member is promoted, and the time it takes from a start of motoring to a point of time when the actual fuel deposition amount is made substantially equal to zero can be shortened. In other words, the time required for causing the motoring unit to execute motoring of the engine can be shortened, and, if energy needs to be supplied to the motoring unit for effecting motoring, the energy consumption by the motoring unit can be advantageously reduced.

The fuel injection amount control apparatus of the engine as described above is preferably provided with a pre-start injection commanding unit that causes the fuel injection unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

At a point of time when the injection of the fuel is started with the engine start condition satisfied (i.e., upon a re-start of the engine), the engine is not completely warmed up since it has been continuously stopped for a certain period of time up to the present time. Therefore, the fuel injected from the fuel injecting unit (e.g., the injector) is less likely to be atomized or vaporized, and the proportion of fuel that is in the form of liquid drops in the fuel flowing into the cylinder is increased. The fuel in the form of liquid drops are less likely to be burned in the cylinder as compared with the fuel that has been atomized. In this case, therefore, the amount of unburned components, such as HC and CO, in the exhaust gas is increased, and the amount of emissions from the engine is accordingly increased. It is thus preferable to reduce the amount of the fuel injected from the fuel injecting unit at the time of a re-start of the engine.

In the meantime, in the fuel injection amount control apparatus of the engine as described above, the fuel injection amount determining unit is arranged to determine the amount of fuel injected from the fuel injecting unit, based on the fuel deposition amount estimated by the fuel deposition estimating unit. Accordingly, if the fuel deposition amount estimating unit starts estimation of the fuel deposition amount upon a re-start of the engine while the initial value of the fuel deposition amount estimated by the fuel deposition amount estimating means is set to a certain value larger than zero, the amount of fuel injected from the fuel injecting unit can be reduced by an amount of fuel that is released from the intake passage forming member and drawn into the cylinder, out of the predetermined amount of the fuel deposited on the intake passage forming member at the time of the re-start of the engine.

As described above, if the predetermined amount of fuel (that is larger than zero) is actually injected after the actual fuel deposition amount becomes substantially equal to zero through the particular process and before the injection of the fuel is started with the engine start condition satisfied (namely, prior to a re-start of the engine), the estimation of the fuel deposition amount by the fuel deposition amount estimating unit is started in the condition that the initial value of the fuel deposition amount estimated by the fuel deposition amount estimating unit upon the re-start of the engine is set to the above-indicated predetermined amount, and therefore the estimated and actual values of the fuel deposition amount on the intake passage forming member can be made substantially equal to each other during re-starting of the engine. Furthermore, the amount of fuel injected from the fuel injecting unit can be reduced. Consequently, during re-starting of the engine, the fuel injection amount can be determined to be an appropriate amount, to thereby provide a target (desired) air/fuel ratio, and the amount of emissions from the engine can be reduced.

It is also preferable that the above-indicated predetermined amount in which the pre-start injection commanding unit commands the fuel injecting unit to inject the fuel is equal to an amount of fuel that is supposed to be actually deposited on the intake passage forming member at a certain point of time after the injection of the fuel is started with the engine start condition satisfied.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein.

DETAILED DESCRIPTION OF EXEMPLARY EMBODIMENT

Figure 1:
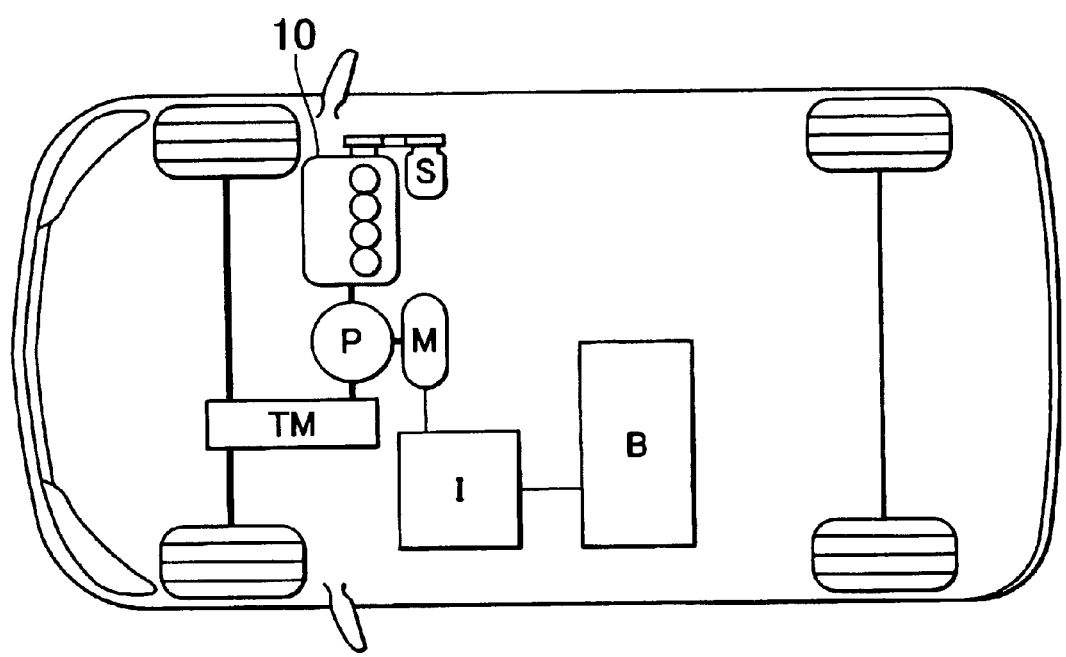
FIG. 1 is a schematic view showing a power transmitting system of a vehicle in which is installed a spark ignition type, multi-cylinder internal combustion engine to which a fuel injection amount control apparatus according to one embodiment of the invention is applied.

A fuel injection amount control apparatus of an internal combustion engine according to an exemplary embodiment of the invention will be described in detail with reference to the accompanying drawings. FIG. 1 schematically shows a power transmitting system of a vehicle in which a multi-cylinder (four-cylinder) internal combustion engine 10 of spark ignition type is installed. The fuel injection amount control apparatus of this embodiment is applied to the internal combustion engine 10.

The vehicle shown in FIG. 1 is a so-called hybrid vehicle of front-wheel drive type, which includes two types of power sources, i.e., the internal combustion engine 10 and an electric motor M, which generate respective driving forces. To run the vehicle, front wheels are driven by using one of the driving forces of the two power sources, or an optimized combination of the driving forces, depending upon the running conditions of the vehicle. In FIG. 1, the thick solid lines indicate power transmission paths. More specifically, the vehicle includes the engine 10, electric motor M, a power switching mechanism P capable of switching the power transmission path (and direction) depending upon the conditions of the vehicle, and a transmission TM that transmits power from the power switching mechanism P toward the front wheels.

The electric motor M is an alternating current synchronous motor, which is driven in a controlled manner by a certain amount of ac power supplied from an inverter I that converts dc power supplied from a battery B into the ac power.

The power switching mechanism P has three running modes, i.e., a motor running mode in which only the power of the electric motor M is transmitted to the transmission TM, an engine running mode in which only the power of the engine 10 is transmitted to the transmission TM, and a motor assist running mode in which both the power of the engine 10 and the power of the electric motor M are transmitted to the transmission TM. When any one of the three modes is selected, the front wheels of the vehicle are driven in the selected mode.

The power switching mechanism P further has a motoring mode in which the power of the electric motor M is transmitted to the engine 10 so as to effect motoring of the engine 10. When the motoring mode is selected, motoring of the engine 10 is carried out, namely, the engine 10 is rotated by the driving force of the electric motor M while injection of fuel is being stopped. Thus, the electric motor M and the power switching mechanism P correspond to a motoring unit.

Figure 2:
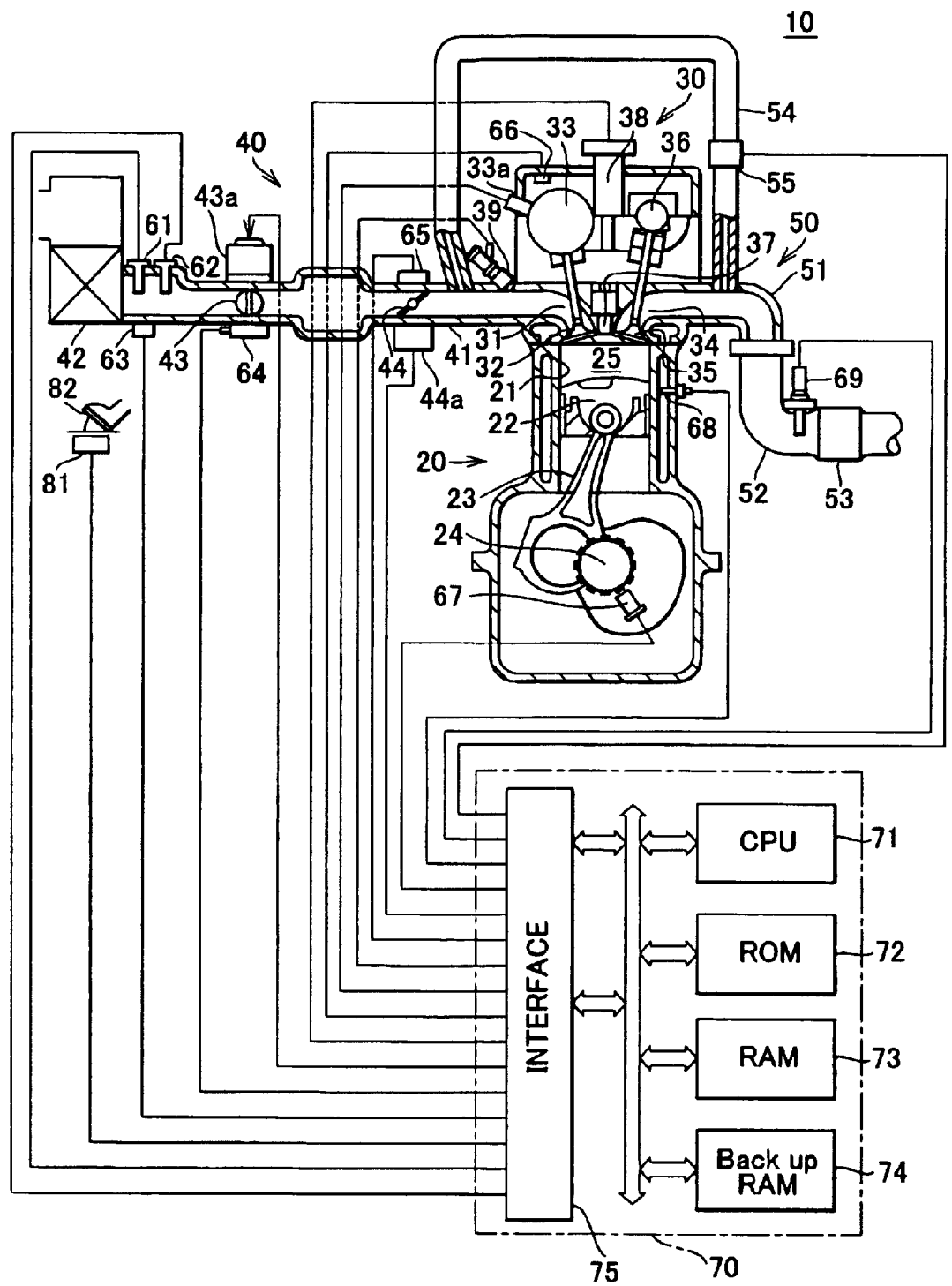
FIG. 2 is a schematic view showing a system in which the fuel injection amount control apparatus of the embodiment of the invention is applied to the spark ignition type, multi-cylinder internal combustion engine.

Referring next to FIG. 2, a system in which the fuel injection amount control apparatus of the embodiment of the invention is applied to the internal combustion engine 10 will be described.

As shown in FIG. 2, the engine 10 has a cylinder block section 20 including a cylinder block, a cylinder block lower case, an oil pan and other components, a cylinder head section 30 fixed to the top of the cylinder block section 20, an intake system 40 for supplying a mixture of air and gasoline to the cylinder block section 20, and an exhaust system 50 for discharging exhaust gas from the cylinder block section 20 to the outside of the engine 10.

The cylinder block section 20 includes a cylinder 21, a piston 22, a connecting rod 23 and a crankshaft 24. The piston 22 is adapted to reciprocate within the cylinder 21, and the reciprocation of the piston 22 is transmitted to the crankshaft 24 via the connecting rod 23, so that the crankshaft 24 is rotated. Head portions of the cylinder 21 and the piston 22 cooperate with the cylinder head section 30 to form a combustion chamber 25.

The cylinder head section 30 includes an intake port 31 that communicates with the combustion chamber 25, an intake valve 32 for opening and closing the intake port 31, an intake camshaft for driving the intake valve 32, a variable intake timing device 33 for continuously changing the phase angle of the intake camshaft, and an actuator 33a of the variable intake timing device 33. The cylinder head section 30 also includes an exhaust port 34 that communicates with the combustion chamber 25, an exhaust valve 35 for opening and closing the exhaust port 34, and an exhaust camshaft 36 for driving the exhaust valve 35. The cylinder head section 30 further includes an ignition plug 37, an ignitor 38 including an ignition coil for generating a high voltage to be applied to the ignition plug 37, and an injector (or a fuel injecting unit) 39 for injecting fuel into the intake port 31.

The intake system 40 includes an intake pipe 41 that communicates with the intake port 31 and includes an intake manifold, and an air filter 42 provided in an end portion of the intake pipe 41. The intake pipe 41 including the intake manifold and the intake port 31 cooperate to form an intake passage. The intake system 40 further includes a throttle valve 43 disposed in the intake pipe 41 for varying the cross-sectional area of the intake passage, and a swirl control valve 44 (which will be called "SCV" when appropriate). The throttle valve 43 is adapted to be driven and rotated in the intake pipe 41 by a throttle valve actuator 43a that consists of a DC motor. The SCV 44 is rotatably supported by the intake pipe 41 at a position downstream of the throttle valve 43 and upstream of the injector 39, and is adapted to be driven and rotated by a SCV actuator 44a that consists of a DC motor. In the present specification, the intake pipe 41 including the intake manifold, intake port 31, intake valve 32, SCV 44 and so forth will be called "members that form the intake passage" or "intake passage forming members".

Figure 3:
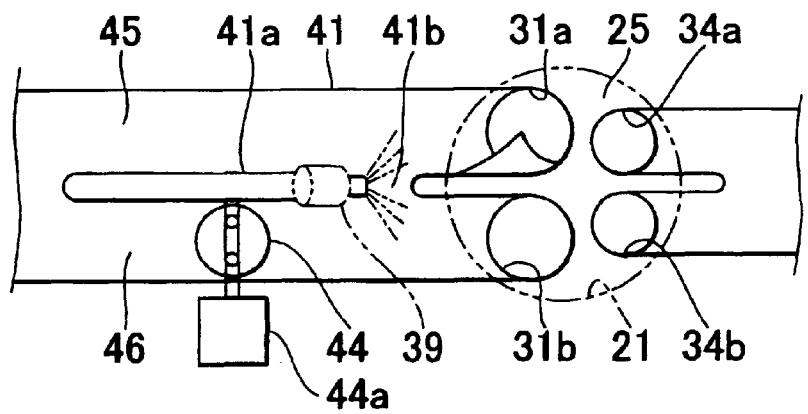
FIG. 3 is a plan view schematically showing a combustion chamber of a particular cylinder of the engine shown in FIG. 2, and a portion of the engine in the vicinity of the combustion chamber.

FIG. 3 is a schematic plan view showing the combustion chamber 25 of one of the cylinders (a particular cylinder), and a portion of the engine 10 located in the vicinity of the combustion chamber 25. As shown in FIG. 3, the intake port 31 actually consists of a pair of intake ports 31a, 31b for each cylinder. The intake port 31a is formed in a helical shape to provide a so-called swirl port, so as to produce the swirling action of the air to be drawn into the combustion chamber 25, and the intake port 31b provides a so-called straight port.

A partition wall 41a that extends in the longitudinal direction of the intake pipe 41 is formed in a portion of the intake pipe 41 that extends from a surge tank to each combustion chamber 25 (namely, is formed in a part of the intake manifold). The intake pipe 41 is divided by the partition wall 41a into a first intake manifold 45 that communicates with the intake port 31a, and a second intake manifold 46 that communicates with the intake port 31b. The SCV 44 is rotatably supported in the second intake manifold 46, and is operable to change the cross-sectional area of the second intake manifold 46.

A communication path 41b that communicates the first and second intake manifolds 45, 46 with each other is formed in a suitable portion of the partition wall 41a. The injector 39 is fixed at a position close to the communication path 41b, and is arranged to inject fuel toward the intake ports 31a, 31b. At the time of fuel injection, a part of the fuel injected from the injector 39 adheres to or is deposited on the intake passage forming members.

Referring again to FIG. 2, the exhaust system 50 includes an exhaust manifold 51 that communicates with the exhaust port 34, an exhaust pipe 52 connected to the exhaust manifold 51, a catalytic converter (three-way catalyst device) 53 mounted in the exhaust pipe 52, an EGR passage 54 and an EGR valve 55. The EGR valve 55 is disposed in the EGR passage 54, and serves to permit or inhibit flow of exhaust gas through the EGR passage 54. Here, the exhaust port 34, exhaust manifold 51 and the exhaust pipe 52 form an exhaust passage.

The EGR passage 54 communicates the exhaust passage located downstream of the exhaust port 34 with the intake passage located downstream of the throttle valve 43 and upstream of the injector 39. When the EGR valve 55 is opened, a part of the exhaust gas passing the exhaust passage is introduced into the intake passage under a negative pressure in the intake pipe 41.

In the meantime, the system of FIG. 2 includes a heat-wire-type air flow meter 61, an intake air temperature sensor 62, an atmospheric pressure sensor (i.e., a sensor for measuring a pressure upstream of the throttle valve) 63, a throttle position sensor 64 and a SCV opening sensor 65. The system further includes a cam position sensor 66, a crank position sensor 67, a water temperature sensor 68, an air/fuel ratio sensor 69 and an accelerator position sensor 81.

Figure 4:
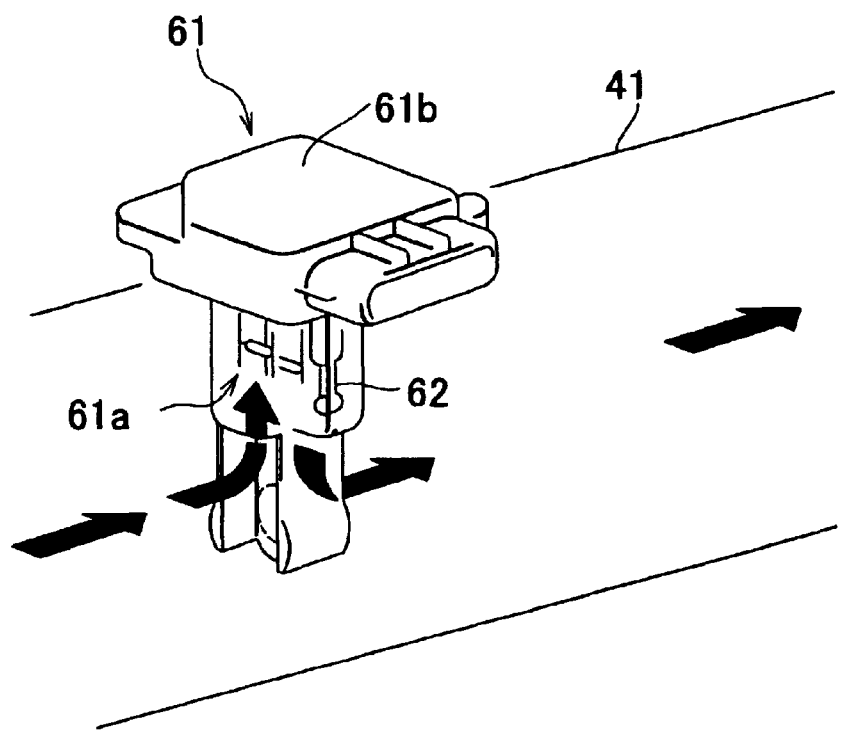
FIG. 4 is a schematic perspective view of an air flow meter of the engine shown in FIG. 2.
Figure 5:
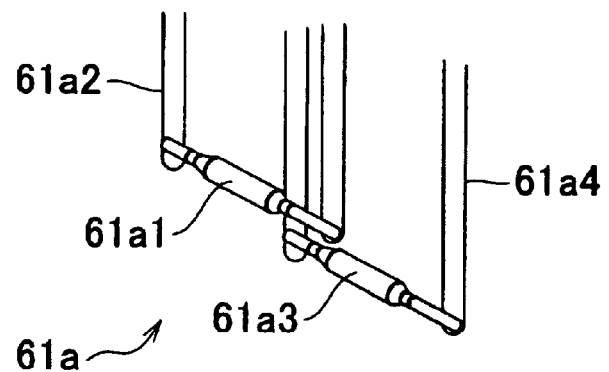
FIG. 5 is an enlarged perspective view of a heat wire measuring portion of the air flow meter shown in FIG. 4.

As schematically shown in FIG. 4, the air flow meter 61 consists of a bypass passage that permits flow of a part of the intake air in the intake pipe 41, a heat wire measuring portion 61a and a signal processing portion 61b. The heat wire measuring portion 61a measures the mass flow of intake air that passes the bypass passage, and the signal processing portion 61b outputs a voltage Vg corresponding to the mass flow thus measured. As shown in the enlarged perspective view of FIG. 5, the heat wire measuring portion 61a includes a resistor (a bobbin portion) 61a1 for measuring the intake air temperature, which consists of a platinum heat wire, a support portion 61a2 that holds the resistor 61a1 for connection with the signal processing portion 61b, a heating resistor (a heater) 61a3, and a support portion 61a4 that holds the heating resistor 61a3 for connection with the signal processing portion 61b. The signal processing portion 61b includes a bridge circuit that consists of the resistor 61a1 for measuring the intake air temperature and the heating resistor 61a3. In operation, the signal processing portion 61b adjusts electric power supplied to the heating resistor 61a3 so that a difference in the temperature between the resistor 61a1 and the heating resistor 61a3 is kept always constant by the bridge circuit, and converts the thus supplied electric power to the voltage Vg, which provides an output signal of the air flow meter 61.

The intake air temperature sensor 62, which is provided in the air flow meter 61, measures the temperature of the intake air, and outputs a signal indicative of the intake air temperature THA. The atmospheric pressure sensor 63 measures the pressure upstream of the throttle valve 43 (namely, the atmospheric pressure), and outputs a signal indicative of the throttle valve upstream pressure Pa. The throttle position sensor 64 measures the opening angle of the throttle valve 43, and outputs a signal indicative of the throttle opening TA. The SCV opening sensor 65 measures the opening angle of the SCV 44, and outputs a signal indicative of the SCV opening θiv.

The cam position sensor 66 generates a signal (G2 signal) having one pulse each time the intake camshaft rotates 90° (namely, each time the crankshaft 24 rotates 180°). The crank position sensor 67 outputs a signal having a narrow pulse each time the crankshaft 24 rotates 10° and having a wide pulse each time the crankshaft 24 rotates 360°. This signal represents the engine speed Ne. The water temperature sensor 68 measures the temperature of a coolant of the engine 10, and outputs a signal indicative of the coolant temperature THW. The air/fuel ratio sensor 69 generates an electric current corresponding to the air/fuel ratio A/F of the exhaust gas that flows into the catalytic converter 53, and outputs a voltage signal vabyfs corresponding to the current. The accelerator position sensor 81 outputs a signal indicative of an operation amount Accp of an accelerator pedal 82 that is operated by the driver.

An electronic control unit 70 is a microcomputer mainly consisting of CPU 71, ROM 72, RAM 73, backup RAM 74, interface 75 and other components, which are connected to each other by a bus. The ROM 72 stores in advance programs to be executed by the CPU 71, tables (e.g., lookup tables and maps), constants, and the like, and the RAM 73 allows the CPU 71 to temporarily store data as needed. The backup RAM 74 stores data while the power supply is in the ON state, and holds the stored data while the power supply is in the OFF state as well as the ON state. The interface 75, which includes AD converters, is connected to the sensors 61–69, 81 and various other sensors that are not illustrated. In operation, the interface 75 supplies signals from the sensors 61–69, 81 to the CPU 71, and sends drive/control signals to the actuator 33a of the variable intake timing device 33, ignitor 38, injector 39, throttle valve actuator 43a, SCV actuator 44a, EGR valve 55, inverter I shown in FIG. 1, and the power switching mechanism P, according to commands received from the CPU 71.

With this arrangement, the inverter I converts dc power supplied from the battery B into certain ac power that depends upon the running conditions of the vehicle, and the driving (or torque) of the electric motor M is controlled depending upon the running conditions of the vehicle, based on the ac power supplied from the inverter I. Also, the opening and closing of the EGR valve 55 is controlled as needed, depending upon the operating state of the engine 10. In this connection, a flag XEGR indicating the EGR valve state is stored in the RAM 73. The CPU 71 sets the value of the EGR valve state flag XEGR to "1" when the EGR valve 55 is opened, and sets the value of the flag XEGR to "0" when the EGR valve 55 is closed.

The mode of the power switching mechanism P is selected depending upon the running conditions of the vehicle. When the power switching mechanism P is placed in the engine running mode or the motor assist mode, the fuel is injected into the engine 10 so that the engine 10 generates driving force. When the power switching mechanism P is placed in the motor running mode, on the other hand, the injection of the fuel is stopped, and the engine 10 does not generate driving force.

Thus, the internal combustion engine 10 is started with the driving force of a starter S shown in FIG. 1 and the fuel injection is started when an engine start condition is satisfied, more specifically, when the driver operates an ignition switch (not shown) from "ON" to "START" while fuel injection is being stopped, or when the power switching mechanism P is switched from the motor running mode to the engine running mode or the motor assist running mode while the ignition switch is placed in the ON state. On the other hand, the fuel injection is stopped and the engine 10 stops operating when an engine stop condition is satisfied, more specifically, when the driver operates the ignition switch from "ON" to "OFF" while the engine 10 is being operated with the fuel injected thereto, or when the power switching mechanism P is switched from the engine running mode or the motor assist running mode to the motor running mode while the ignition switch is placed in the ON state.

Next, a method executed by the fuel injection amount control apparatus constructed as described above for determining the fuel injection amount by using a physical model will be explained. The CPU 71 executes a suitable program so as to carry out the process as described below.

Method of Determining Required Fuel Injection Amount fc

Since fuel must be injected into a cylinder that is in the suction stroke before the intake valve 32 of the cylinder is closed in the engine 10 constructed as described above, the fuel injection amount control apparatus needs to predict an amount (in-cylinder intake air amount) of intake air that is supposed to be drawn or introduced in the cylinder at the time when the intake valve 32 is closed. In the meantime, the intake pipe pressure PMFWD for the time of closing of the intake valve 32 is proportional to the amount of air introduced in the combustion chamber 25 at that time. Accordingly, if the intake pipe pressure PMFWD can be predicted, the actual in-cylinder intake air amount can be estimated. Thus, the fuel injection amount control apparatus of the present embodiment predicts or estimates the intake pipe pressure PMFWD that will be achieved at the time of closing of the intake valve 32, and calculates a value KLFWD equivalent to the intake air amount per cylinder by dividing the estimated intake pipe pressure PMFWD by the product of the displacement of one cylinder and the air density. The fuel injection amount control apparatus then determines the required fuel injection amount (or basic injection amount) fc according to the expression (1) below, based on the value KLFWD thus calculated. In the expression (1), K is coefficient that changes in accordance with a set air/fuel ratio.

$$fc = K \cdot KLFWD \tag{1}$$

The fuel injection amount control apparatus may also calculate the current intake air amount mtAFM based on a Vg—mtAFM conversion table of FIG. 6 that specifies the relationship between the output voltage Vg of the air flow meter 61 and the intake air amount mtAFM, and the actual output voltage Vg of the air flow meter 61, and may easily determine the required fuel injection amount fc according to the expression (2) as follows.

$$fc = K \cdot mtAFM \tag{2}$$

Figure 7:
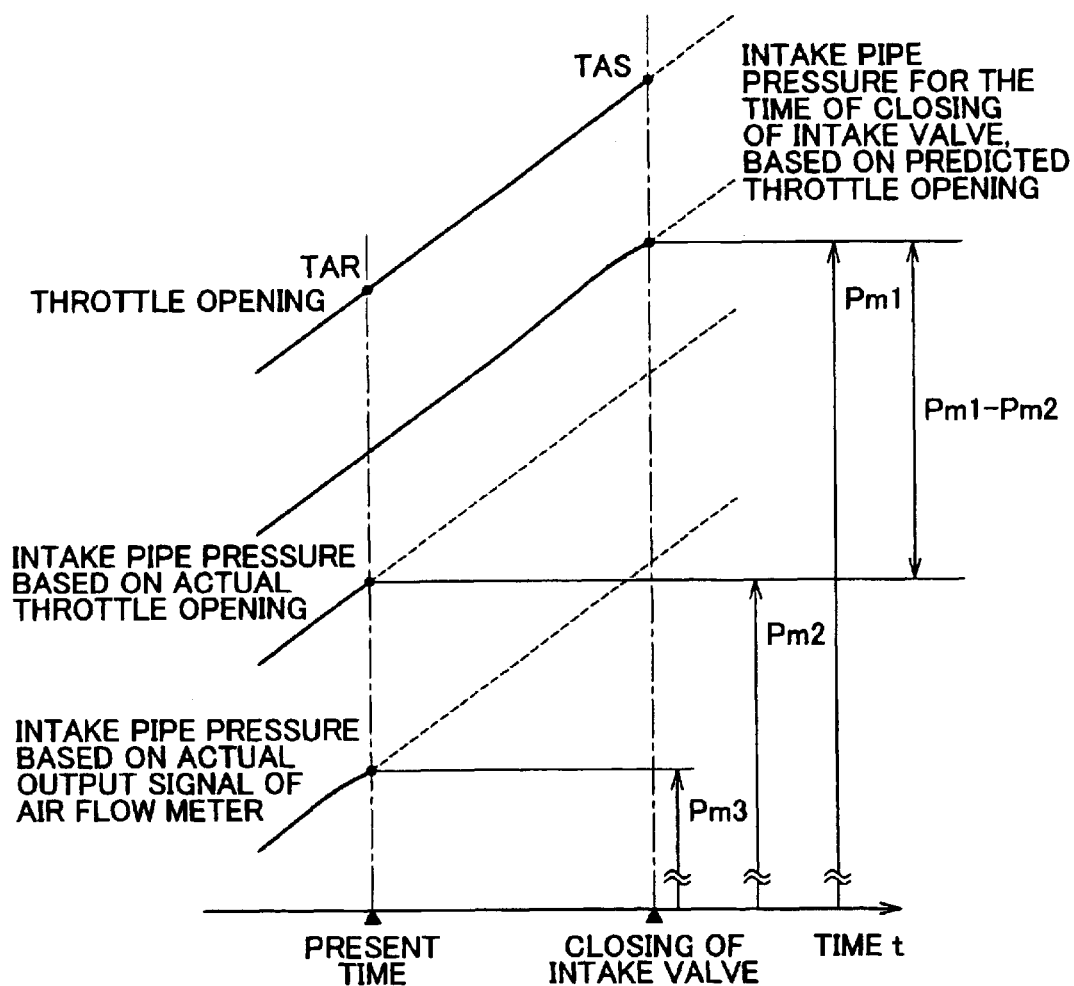
FIG. 7 is a time chart showing changes in the throttle opening and changes in the intake pipe pressure calculated according to various models, for explaining a method of predicting the intake pipe pressure for the time of closing of an intake valve of the engine shown in FIG. 2.

The fuel injection amount control apparatus of the present embodiment that calculates the required fuel injection amount fc according to the above expression (1) predicts the intake pipe pressure PMFWD for the time of closing of the intake valve 32 in the following manner. The control apparatus predicts a throttle opening TAS that will be established at the time of closing of the intake valve 32, and estimates the intake pipe pressure Pm1 that will be established at the time of closing of the intake valve 32, based on the predicted throttle opening TAS, the engine speed Ne and other parameter(s), by using suitable models, as shown in FIG. 7. Also, the control apparatus estimates a value that is supposed to be generated at the present time by the air flow meter 61, based on the actual throttle opening TAR detected at the present time by the throttle position sensor 64, the engine speed Ne and other parameter(s), and estimates the current intake pipe pressure Pm2 based on the estimated value. At the same time, the control apparatus estimates the current intake pipe pressure Pm3, based on the actual output voltage Vg generated at the present time by the air flow meter 61. Finally, the intake pipe pressure PMFWD for the time of closing of the intake valve 32 is calculated according to the following expression (3). In this manner, the control apparatus eliminates a steady error involved in the intake pipe pressure Pm1 as the estimated value based on the predicted value TAS of the throttle opening, by using the actual output voltage Vg of the air flow meter 61, so as to highly accurately estimate the intake pipe pressure PMFWD that will be established at the time of closing of the intake valve 32.

$$PMFWD = Pm3 + (Pm1 - Pm2) \tag{3}$$

When the internal combustion engine 10 is in a steady state in which the throttle opening is kept constant, the intake pipe pressure Pm1 is equal to the intake pipe pressure Pm2, and therefore the intake pipe pressure PMFWD becomes equal to the intake pipe pressure Pm3, as is understood from the above expression (3). In other words, in the steady operating state of the engine 10, the intake pipe pressure PMFWD for the time of closing of the intake valve 32 is determined substantially based on the output voltage Vg of the air flow meter 61.

In the following description, a method of estimating each of the intake pipe pressures Pm1, Pm2 and Pm3, along with models used for the estimation, will be described.

Method of Determining Pm1

Figure 8:
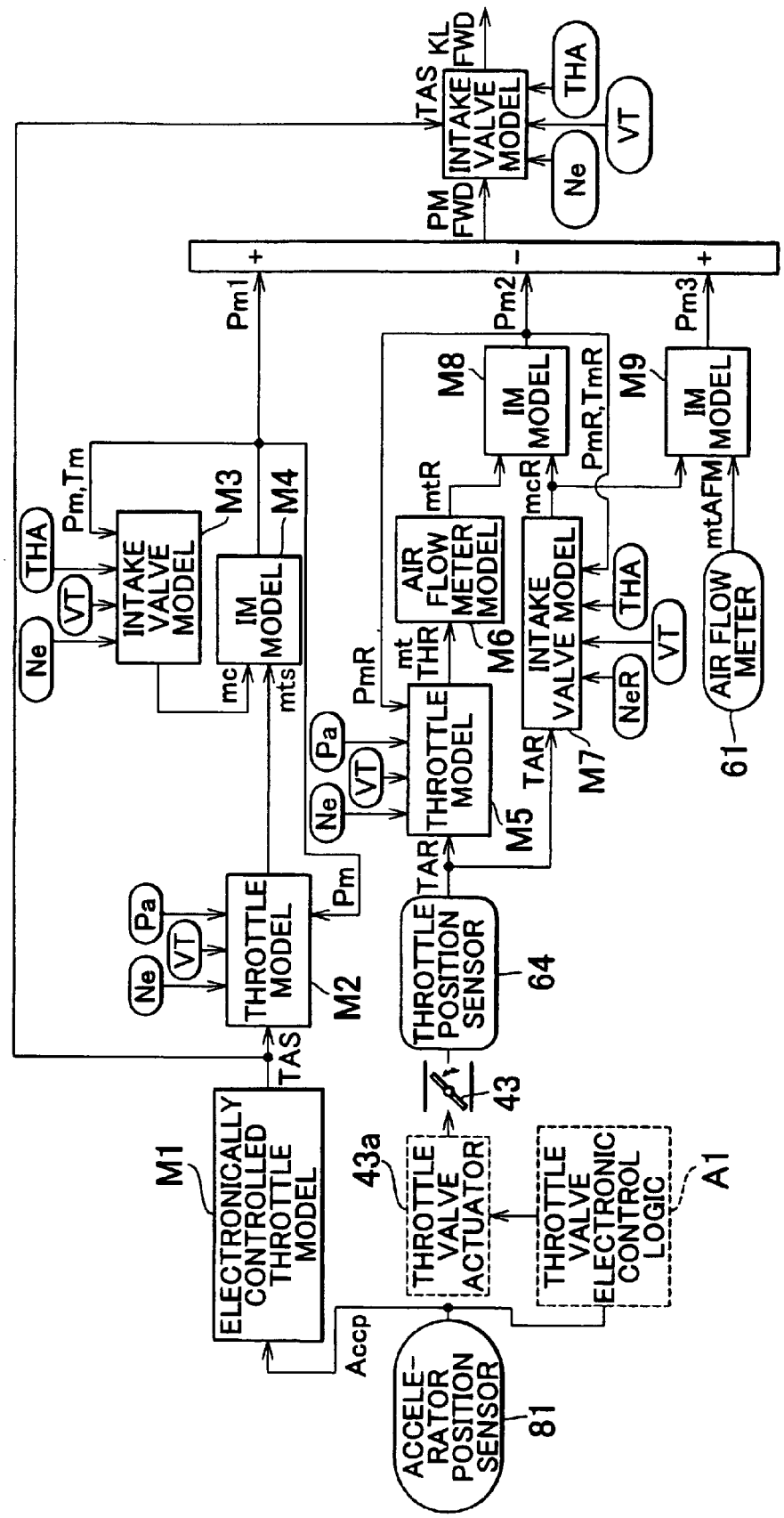
FIG. 8 is a function block diagram showing the relationships among various models employed by the fuel injection amount control apparatus of FIG. 2 for estimating a value equivalent to an in-cylinder intake air amount for the time of closing of the intake valve.

As shown in FIG. 8, the intake pipe pressure PM1 is estimated by an electronically controlled throttle model M1, throttle model M2, intake valve model M3 and an intake manifold model M4.

(1) Electronically Controlled Throttle Model M1

Figure 9:
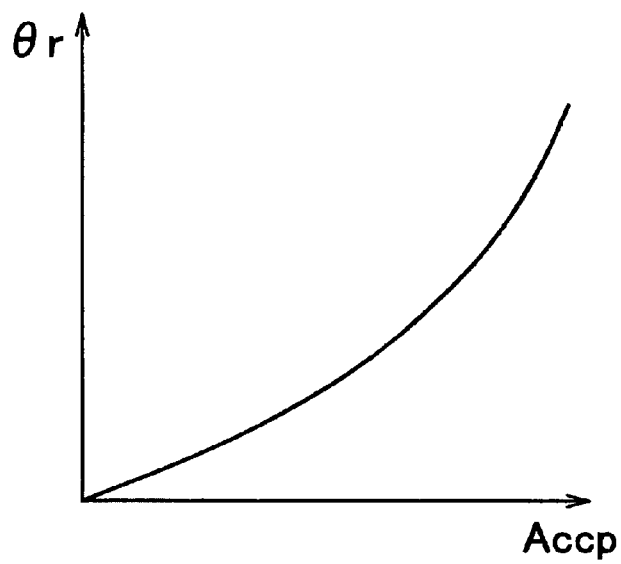
FIG. 9 is a graph showing a table that specifies the relationship between an accelerator pedal operation amount read by the CPU shown in FIG. 2, and a target throttle opening.

The electronically controlled throttle model M1 estimates the throttle opening TAS that will be established at the time of closing of the intake valve 32, based on the accelerator pedal operation amount Accp measured up to the present point in time. In the present embodiment, a throttle valve electronic control logic A1 determines a provisional target throttle opening θr1, based on the accelerator pedal operation amount Accp detected by the accelerator position sensor 81, and a table of FIG. 9 that specifies the relationship between the accelerator pedal operation amount Accp and the target throttle opening θr. Then, a value obtained by delaying the provisional target throttle opening θr1 by a predetermined time T (e.g., 64 msec) is determined as a final target throttle opening θr. Then, the throttle valve electronic control logic A1 (i.e., the electronic control unit 70) sends a drive signal to the throttle valve actuator 43a so that the actual throttle opening TA becomes equal to the target throttle opening θr.

Since the target throttle opening θr is determined depending upon the accelerator pedal operation amount Accp detected at a point of time ahead of the present time by the predetermined time T as described above, the target throttle opening θr for the time of closing of the intake valve 32 is equal to the provisional throttle opening θr1 obtained at a point of time that is ahead of the present time by (T−t) where t represents a period of time from the present time to the time of closing of the intake valve 32. Also, the target throttle opening θr is equal to the throttle opening TAS if any delay in the operation of the throttle valve actuator 43a is ignored.

Based on these findings, the electronically controlled throttle model M1 determines time t from the present time to the time of closing of the intake valve 32, based on the detected engine speed Ne, and the opening/closing timing (advance amount) VT of the intake valve 32 that is separately determined depending upon the operating state of the engine 10, and estimates the throttle opening TAS that will be established at the time of closing of the intake valve 32, based on the time t and the history of changes or progression of the accelerator pedal operation amount Accp (or the provisional target throttle opening θr1) from a point of time ahead of the present time by the predetermined time T to the present time. The above-indicated opening/closing timing VT may be replaced by the actual opening/closing timing obtained from the engine speed signal Ne and the above-indicated G2 signal. The throttle opening TAS may also be estimated in view of the delay in the operation of the throttle valve actuator 43a.

(2) Throttle Model M2

The throttle model M2 estimates the amount of air that passes the throttle valve 43 (which will be called "throttle passing air amount") mt, based on the following expressions (4) and (5) obtained based on the law of conservation of energy, law of conservation of momentum, law of conservation of mass, and an equation of state. In the expressions (4) and (5), $\mu$ is flow coefficient, At is area of the opening of the throttle valve 43, v is flow rate of the air that passes the throttle valve 43, Pa is pressure measured upstream of the throttle valve 43, Pm is intake pipe pressure, Ta is intake air temperature, $\rho m$ is intake air density, R is gas constant, and $\kappa$ is ratio of specific heat ($\kappa$ is handled as a constant value).

$$mt = \mu \cdot At \cdot v \cdot \rho m = \mu \cdot At \cdot \{Pa/(R \cdot Ta)^{1/2}\} \cdot \Phi((Pm/Pa)) \quad (4)$$

$$\Phi(Pm/Pa) = \begin{cases} \sqrt{\dfrac{\kappa}{2 \cdot (\kappa+1)}} & (Pm/Pa) \leq \dfrac{1}{\kappa+1} \\ \sqrt{\left\{\dfrac{\kappa-1}{2 \cdot \kappa} \cdot \left(1 - \dfrac{Pm}{Pa}\right) + \dfrac{Pm}{Pa}\right\} \cdot \left(1 - \dfrac{Pm}{Pa}\right)} & (Pm/Pa) > \dfrac{1}{\kappa+1} \end{cases} \quad (5)$$

Here, the above-indicated expression (4) may be rewritten into the following expression (6) in which k1 is certain coefficient ($=\mu \cdot At \cdot \{Pa/(R \cdot Ta)^{1/2}\}$), and mts is throttle passing air amount that will be achieved at the time of closing of the intake valve 32. From the expression (6) is derived the following expression (7) in which mtsTA is throttle passing air amount obtained in the case where the engine 10 is in a steady state (i.e., the case where the throttle opening is constant), and PmTA is intake pipe pressure obtained in this the same case. By eliminating the coefficient k1 from the expressions (6) and (7), the following expression (8) can be obtained.

$$mts = k1 \cdot \Phi(Pm/Pa) \quad (6)$$

$$mtsTA = k1 \cdot \Phi(PmTA/Pa) \quad (7)$$

$$mts = \{mtsTA/\Phi(PmTA/Pa)\} \cdot \Phi(Pm/Pa) \quad (8)$$

The value {mtsTA/Φ (PmTA/Pa)} of the right-hand side of the expression (8) is related to the intake air flow (throttle passing air amount) obtained when the throttle opening TA is constant. This value is substantially uniquely determined if the throttle opening TA, engine speed Ne, opening/closing timing VT of the intake valve 32 and the pressure Pa measured upstream of the throttle valve 43 are determined. The throttle model M2 stores in the ROM 72 a table that specifies the relationship among the throttle opening TA, engine speed Ne, opening/closing timing of the intake valve 32, pressure Pa measured upstream of the throttle valve 43, and the value {mtsTA/Φ (PmTA/Pa)}. The throttle model M2 determines the value {mtsTA/Φ (PmTA/Pa)} based on this table, the estimated throttle opening TAS for the time of closing of the intake valve 32, the actual engine speed Ne, the actual opening/closing timing VT of the intake valve 32, and the actual pressure Pa measured upstream of the throttle valve 43.

Also, the value Φ (Pm/Pa) of the right-hand side of the expression (8) is determined from the intake pipe pressure Pm and the pressure Pa measured upstream of the throttle valve 43 where the ratio of specific heat κ is constant, as is understood from the above expression (5). The throttle model M2 stores in the ROM 72 a table that specifies the relationship among the intake pipe pressure Pm, the throttle valve upstream pressure Pa and the value Φ(Pm/Pa). The throttle model M2 determines the value Φ (Pm/Pa), based on the latest intake pipe pressure Pm that has already been calculated by the intake manifold model M as described later and is available at the present time, and the actual throttle valve upstream pressure Pa. In this manner, the throttle passing air amount mts that will be achieved at the time of closing of the intake valve 32 is determined.

(3) Intake Valve Model M3

The intake valve model M3 estimates the in-cylinder intake air amount mc from the intake pipe pressure Pm, temperature Tm measured in the intake pipe 41, intake air temperature THA and other parameter(s). Since the in-cylinder pressure (i.e., pressure in the cylinder) established at the time of closing of the intake valve 32 can be regarded as the pressure measured upstream of the intake valve 32, namely, the intake pipe pressure Pm established at the time of closing of the intake valve 32, the in-cylinder intake air amount mc is proportional to the intake pipe pressure Pm established at the time of closing of the intake valve 32. Thus, the intake valve model M3 determines the in-cylinder intake air amount mc according to the following expression (9) based on a rule of thumb.

$$mc = (THA/Tm) \cdot (c \cdot Pm - d) \quad (9)$$

In the above expression (9), value c is proportional coefficient, and value d is amount of burned gas remaining in the cylinder. The intake valve model M3 stores in the ROM 72 a table that specifies respective relationships between the engine speed Ne and the opening/closing timing VT of the intake valve 32, and the proportional coefficient c and the burned gas amount d. The intake valve model M3 determines the proportional coefficient c and the burned gas amount d, based on the throttle opening TAS estimated by the electronically controlled throttle model M1 for the time of closing of the intake valve 32, the actual engine speed Ne, the actual opening/closing timing VT of the intake valve 32, and the table stored in the ROM 72. Also, the intake valve model M3 estimates the in-cylinder intake air amount mc for the time of closing of the intake valve 32, by applying the latest intake pipe pressure Pm for the time of closing of the intake valve 32 and the latest air temperature Tm within the intake pipe 41, which have already been estimated by the intake manifold model M4 as described later and are available at the time of calculation of the in-cylinder intake air amount mc, to the above expression (9).

(4) Intake Manifold Model M4

The intake manifold model M4 determines the intake pipe pressure Pm that will be established at the time of closing of the intake valve 32, and the temperature Tm within the intake pipe 41 which will be established at the time of closing of the intake valve 32, according to the following expressions (10) and (11) based on the law of conservation of mass and the law of conservation of energy, respectively. In the expressions (10), (11), V is volume of the intake pipe 41, R is gas constant, mt is throttle passing air amount, and Ta is temperature of the air passing the throttle valve 43 (namely, the intake air temperature THA).

$$dPm/dt = \kappa \cdot (R/V) \cdot (mt \cdot Ta - mc \cdot Tm) \quad (10)$$

$$d(Pm/Tm)/dt = (R/V) \cdot (mt - mc) \quad (11)$$

As shown in FIG. 8, the intake manifold model M4 uses the throttle passing air amount mts estimated by the throttle model M2 as the throttle passing air amount mt in the above expressions (10), (11), and uses the in-cylinder intake air amount mc for the time of closing of the intake valve 32, which is estimated by the intake valve model M3, as the in-cylinder intake air amount mc in the above expressions (10), (11). The intake pipe pressure Pm for the time of closing of the intake valve 32 and the intake pipe temperature Tm (the temperature Tm in the intake pipe) for the time of closing of the intake valve 32 thus obtained according to the above expressions (10), (11) are used when the EGR valve 55 is closed (i.e., when the value of the EGR valve state flag XEGR is equal to "0"). When the EGR valve 55 is opened (i.e., when the value of the EGR valve state flag XEGR is equal to "1"), the intake manifold model M4 corrects the intake pipe pressure Pm for the time of closing of the intake valve 32 and the intake pipe temperature Tm for the time of closing of the intake valve 32 obtained according to the above expressions (10), (11) by using respective predetermined tables stored in the ROM 72, in view of the influence of exhaust gas flowing into the intake pipe 41. In this manner, the intake manifold model M4 determines a final intake pipe pressure Pm for the time of closing of the intake valve 32 and a final intake pipe temperature Tm for the time of closing of the intake valve 32. The intake pipe pressure thus estimated by the intake manifold model M4 provides the estimated intake pipe pressure Pm1 as indicated above.

Method of Determining Pm2

The intake pipe pressure Pm that is based on the value that is supposed to be generated at the present time by the air flow meter 61 is obtained by a throttle model M5 that is the same model as the throttle model M2, an air flow meter model M6, an intake valve model M7 that is the same as the intake valve model M3, and an intake manifold model M8 that is the same as the intake manifold model M4.

(5) Throttle Model M5

More specifically, the throttle model M5 estimates the current throttle passing air amount mtTHR, according to the following expression (12) derived from the above expression (8).

$$mtTHR = \{mtsTA/\Phi(PmTA/Pa)\} \cdot \Phi(Pm/Pa) \quad (12)$$

The throttle model M5 calculates the value $\{mtsTA/\Phi(PmTA/Pa)\}$ of the right-hand side of the above expression (12), based on the above-described table that specifies the relationship between the throttle opening TA, engine speed Ne, opening/closing timing VT of the intake valve 32 and the throttle valve upstream pressure Pa, and the value $\{mtsTA/\Phi (PmTA/Pa)\}$, the throttle opening TA actually detected by the throttle position sensor 64 (which will be called "actual throttle opening TAR"), the actual engine speed Ne, the actual or calculated opening/closing timing VT of the intake valve 32, and the actual throttle valve upstream pressure Pa.

The throttle model M5 calculates the value $\Phi$ (Pm/Pa) of the right-hand side of the above expression (12), based on the above-described table that specifies the relationship between the intake pipe pressure Pm and the throttle valve upstream pressure Pa, and the value $\Phi$(Pm/Pa), the latest intake pipe pressure PmR that has already been calculated by the intake manifold model M8 which will be described later, and the actual throttle valve upstream pressure Pa. In this manner, the current throttle passing air amount mtTHR is determined.

(6) Air Flow Meter Model M6

The air flow meter model M6 estimates the value that is supposed to be generated by the air flow meter 61 when the throttle passing air amount is equal to a predetermined amount α, and estimates the throttle passing air amount mtR based on the estimated value. In this case, the predetermined amount α is equal to the throttle passing air amount mtTHR estimated by the throttle model M5.

The air flow meter model M6 initially calculates the full quantities of dissipated heat W1, W2 with respect to the throttle passing air amount mtTHR, based on a table that specifies the relationship between the full quantities of dissipated heat W1, W2 and the throttle passing air amount mt, and the throttle passing air amount mtTHR determined as described above. The full quantity of dissipated heat W1 is a quantity of heat dissipated by the bobbin portion 61a1 of the heat wire measuring portion 61a of FIG. 5, which quantity does not involve a delay in heat dissipation, and the full quantity of dissipated heat W2 is a quantity of heat dissipated by the support portion 61a2 of the heat wire measuring portion 61a, which quantity does not involve a delay in heat dissipation.

Next, the air flow meter model M6 calculates the quantities of dissipated heat (response dissipated heat quantities) w1, w2 according to the following expressions (13) and (14). The quantities w1, w2 are those of dissipated heat associated with the bobbin portion 61a1 and the support portion 61a2, respectively, and involve response delays having characteristics of first-order lags with respect to the full quantities W1, W2 of dissipated heat, respectively. In the expressions (13), (14), values with subscript "i" represent those calculated in the current control cycle, and values with subscript (i-1) represent those calculated in the last control cycle, while Δt is the time it takes from calculation of the values in the last cycle to calculation of the values in the current cycle.

$$w1_i = \Delta t \cdot (W1_i - W1_{i-1})/\tau 1 + w1_{i-1} \quad (13)$$

$$w2_i = \Delta t \cdot (W2_i - W2_{i-1})/\tau 2 + w2_{i-1} \quad (14)$$

In the above expressions (13), (14), τ1 and τ2 are time constants of the first-order lag characteristics associated with the bobbin portion 61a1 and the support portion 61a2, respectively, and are calculated according to the following expressions (15), (16). In the expressions (15), (16), values k10, k20 and values m1, m2 are empirically obtained. Also, value u represents the amount of air that passes the heat wire measuring portion 61a of the air flow meter 61 per unit cross-sectional area. More specifically, the value u (=mtAFM/S) is obtained by dividing the intake air amount mtAFM obtained based on the Vg—mtAFN conversion table of FIG. 6 that specifies the relationship between the output voltage Vg of the air flow meter 61 and the actually measured intake air amount mtAFM, and the actual output voltage Vg of the air flow meter 61, by the cross-sectional area S of the bypass passage in which the heat wire measuring portion 61a is disposed.

$$\tau 1 = k10 \cdot \mu^{m1} \quad (15)$$

$$\tau 2 = k20 \cdot \mu^{m2} \quad (16)$$

Figure 10:
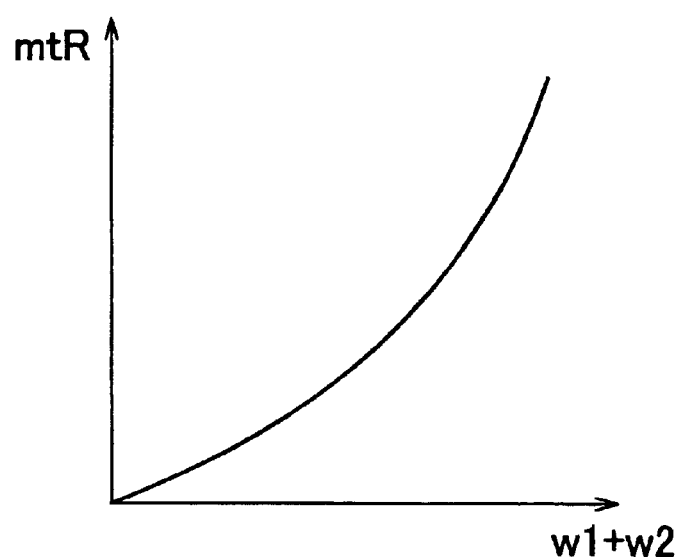
FIG. 10 is a graph showing a table that specifies the relationship between a sum of response dissipated heat quantities read by the CPU shown in FIG. 2, and a throttle passing air amount based on a value that is supposed to be generated by the air flow meter.

The air flow meter model M6 then calculates the throttle passing air amount mtR based on the value that is supposed to be generated at the present time by the air flow meter 61, based on a table of FIG. 10 that specifies the relationship between the sum (w1+w2) of the response dissipated heat quantities w1, w2 and the throttle passing air amount mtR based on the value that is supposed to be generated by the air flow meter 61, and the sum of the response dissipated heat quantities (w1+w2) obtained according to the above expressions (13)–(16).

(7) Intake Valve Model M7

The intake valve model M7 calculates the current in-cylinder intake air amount mcR according to the above-indicated expression (9), in substantially the same manner as that in which the intake valve model M3 calculates the in-cylinder intake air amount mc. It is, however, to be noted that the intake valve model M7 performs calculation of the expression (9) using necessary parameters all of which are obtained at the present point in time, for example, by applying the current intake pipe pressure PmR and the current intake pipe temperature TmR already obtained by the intake manifold model M8 as described later, to the intake pipe pressure Pm and the intake pipe temperature Tm in the expression (9).

(8) Intake Manifold Model M8

The intake manifold model M8 calculates the current intake pipe pressure Pm and the current intake pipe temperature Tm by using the above expressions (10), (11), in substantially the same manner as that in which the intake manifold model M4 calculates the intake pipe pressure P, and the intake pipe temperature Tm. It is, however, to be noted that the intake manifold model M8 uses the throttle passing air amount mtR obtained by the air flow meter model M6 and the current in-cylinder intake air amount mcR obtained by the intake air model M7 as the throttle passing air amount mt and the in-cylinder intake air amount mc in the expressions (10), (11), respectively. Also, when the EGR valve 55 is opened (i.e., when the value of the EGR valve state flag XEGR is equal to "1"), the intake manifold model M8 corrects the current intake pipe pressure Pm and the current intake pipe temperature Tm obtained according to the above expressions (10), (11), by using the above-described predetermined tables used by the intake manifold model M4, so as to provide a final value of the current intake pipe pressure Pm and a final value of the current intake pipe temperature Tm. The value Pm estimated by the intake manifold model M8 in this manner provides the intake pipe pressure Pm2 based on the value that is supposed to be generated at the present time by the air flow meter 61.

Method of Determining Pm3

The intake pipe pressure Pm3 based on the actual output voltage Vg measured at the present time by the air flow meter 61 is calculated by the intake manifold model M9 that is the same as the intake manifold models M4, M8.

(9) Intake Manifold Model M9

Figure 6:
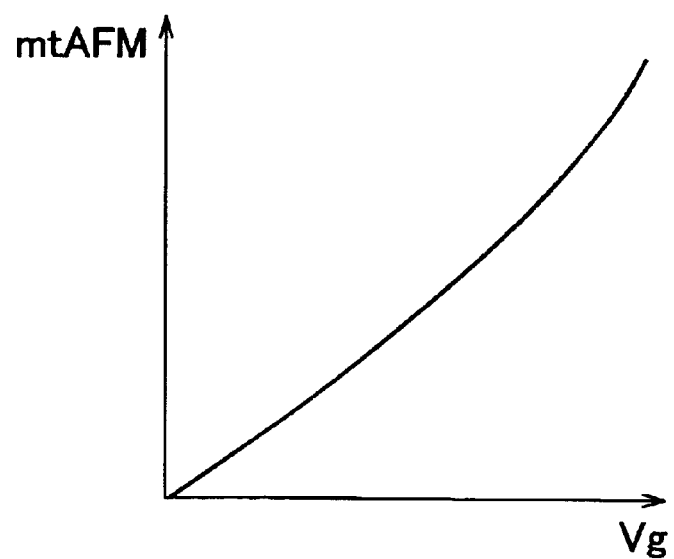
FIG. 6 is a graph showing a table that specifies the relationship between the output signal of the air flow meter read by a CPU shown in FIG. 2, and an intake air amount (intake air flow)

More specifically, the intake manifold model M9 uses the actually measured, current intake air amount mtAFM obtained from the output voltage Vg of the air flow meter 61 and the Vg—mtAFM conversion table shown in FIG. 6, as the throttle passing air amount mt in the expressions (10), (11), and uses the current in-cylinder intake air amount mcR obtained by the above-indicated intake valve model M7 as the in-cylinder intake air amount mt in the expressions (10), (11), so as to calculate the current intake pipe pressure Pm. Also, when the EGR valve 55 is opened, the intake manifold model M9 corrects the intake pipe pressure Pm by using the predetermined table used by the intake manifold model M4, so as to obtain a final value of the current intake pipe pressure Pm. The intake pipe pressure Pm thus estimated by the intake manifold model M9 provides the intake pipe pressure Pm3 based on the actual output voltage Vg measured at the present time by the air flow meter 61. In the manner as described above, the intake pipe pressures Pm1–Pm3 are calculated, and the fuel injection amount control apparatus of the present embodiment calculates the required fuel injection amount fc according to the above-indicated expressions (1) and (3).

Estimation of Fuel Deposition Amount and Fuel Injection Amount Control

Figure 11:
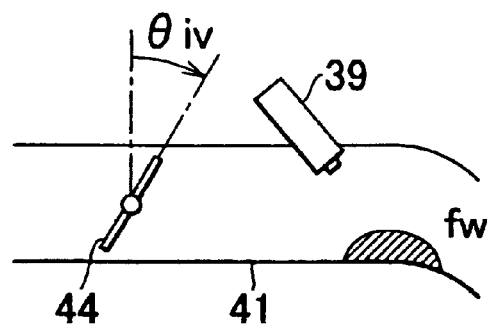
FIG. 11 is a view schematically showing the manner in which fuel injected from an injector is deposited on the intake passage, for explaining a method of estimating the fuel deposition amount by the fuel injection amount control apparatus shown in FIG. 2.

Next, a method of estimating the fuel deposition amount and a method of determining the fuel injection amount, which are practiced by the fuel injection amount control apparatus of the present embodiment, will be explained. As schematically shown in FIG. 11, a part of the fuel injected from the injector 39 adheres to or is deposited on a wall portion of the intake pipe 41 and the intake passage forming members, such as the intake valve, which are not illustrated in FIG. 11.

Figure 12:
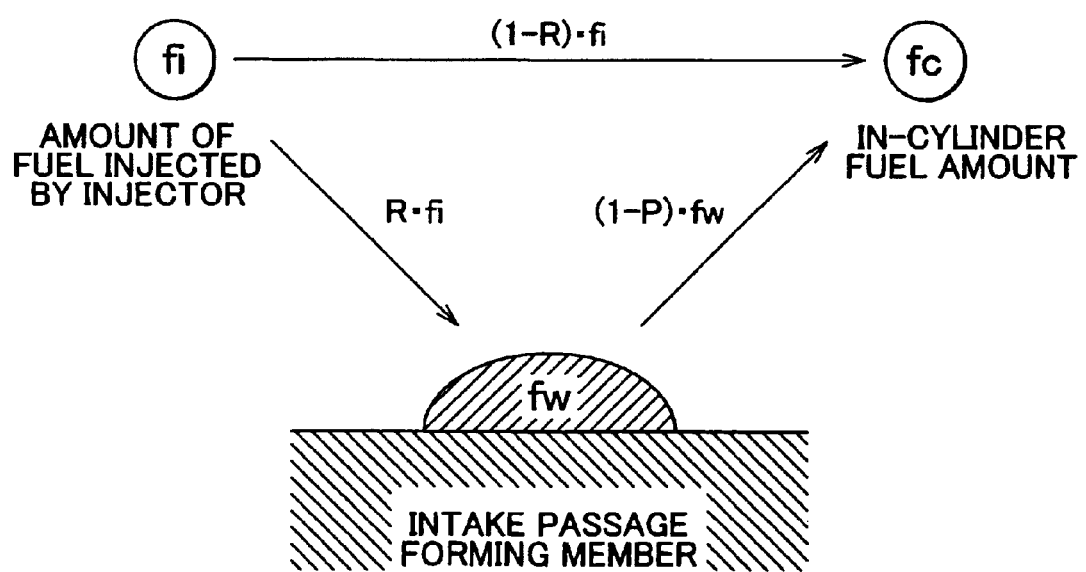
FIG. 12 is a view useful for explaining the relationship among an amount of fuel injected from the injector shown in FIG. 2, an amount of fuel deposited on a member that forms the intake passage, and an amount of fuel that flows into a cylinder.

More specifically described with reference to FIG. 12 concerned with a particular cylinder, the amount of fuel that is newly deposited on the intake passage forming members, out of the fuel injected at this time, is expressed as R·fi(k), and the amount of fuel remaining on the intake passage forming members, out of the fuel that has already been deposited on the intake passage forming members, is expressed as P·fw(k), where fi is amount of fuel injected from the injector 39 during one suction stroke of the particular cylinder, fw is amount of fuel that has already been deposited on the intake passage forming members, P is remaining rate, i.e., the proportion of the fuel remaining on the intake passage forming members after one suction stroke, in the fuel that has already been deposited on the intake passage forming members, and R is deposition rate, i.e., the proportion of the fuel deposited on the intake passage forming members in the fuel injected from the injector 39. Thus, the fuel deposition amount fw(k+1) is expressed by the following expression (17). In the expression (17), subscript "k" accompanies a calculated value for the current suction stroke, and subscript "k+1" accompanies a calculated value for the next suction stroke. The expression (17) describes a fuel deposition model for calculation of the fuel deposition amount, and a means for performing this calculation corresponds to "fuel deposition amount estimating unit".

$$fw(k+1)=R \cdot fi(k)+P \cdot fw(k) \qquad (17)$$

Accordingly, the amount of fuel directly introduced or drawn into the cylinder without adhering to the intake passage forming passages, out of the fuel injected in this cycle, during one suction stroke is expressed as $(1-R) \cdot fi(k)$, and the amount of fuel released from the intake passage forming members and introduced into the cylinder, out of the fuel deposited on the intake passage forming members, is expressed as $(1-P) \cdot fw(k)$. Thus, the amount of fuel fc(k) introduced into the cylinder is expressed by the following expression (18).

$$fc(k)=(1-R) \cdot fi(k)+(1-P) \cdot fw(k) \qquad (18)$$

Here, the remaining rate P and the deposition rate R are determined from the SCV opening θiv detected by the SCV opening sensor 65, the engine speed Ne based on the output signal of the crank position sensor 67, the coolant temperature THW detected by the water temperature sensor 68, the latest intake pipe pressure PMFWD for the time of closing of the intake valve 32, which is calculated according to the expression (3), and predetermined tables respectively based on a function fp and a function fr of the value of the EGR valve state flag XEGR.

Figure 13:
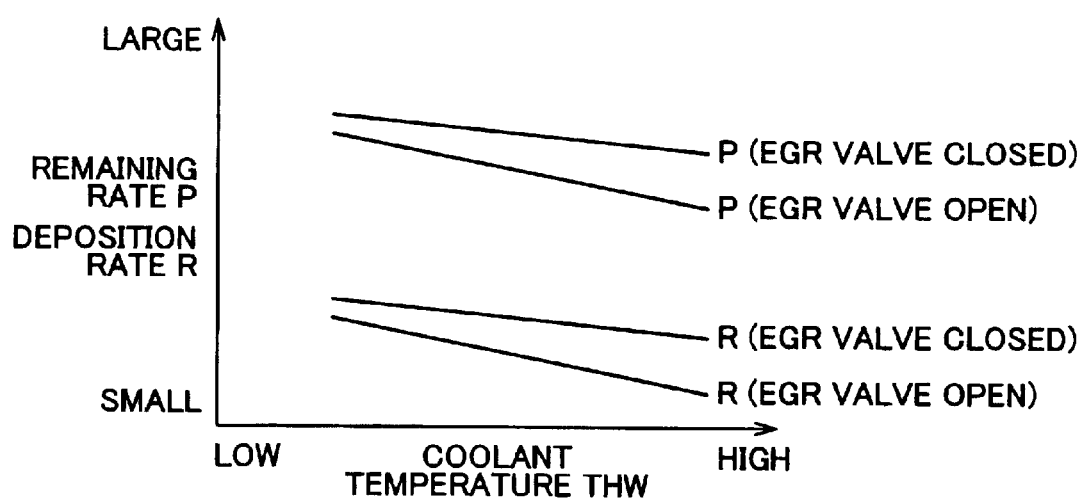
FIG. 13 is a graph showing a table that specifies the relationship between the coolant temperature read by the CPU shown in FIG. 2 and the remaining rate and the relationship between the coolant temperature and the deposition rate, with respect to the case where an EGR valve is in an open state and the case where the EGR valve is in a closed state.

FIG. 13 is a graph showing the relationships between the coolant temperature THW and the remaining rate P and between the coolant temperature THW and the deposition rate R, assuming that the SCV opening θiv, engine speed Ne and the intake pipe pressure PMFWD are equal to certain constant values in the above-indicated predetermined tables. As shown in FIG. 13, both the remaining rate P and the deposition rate R decrease as the coolant temperature THW increases. This is because the wall temperature of the intake pipe 41 is elevated as the coolant temperature THW increases, and evaporation of the fuel deposited on the intake passage forming members and atomization of the fuel injected from the injector 39 are promoted as a result of the increase in the wall temperature.

Where the coolant temperature THW is at the same level, the remaining rate P and the deposition rate R are smaller when the EGR valve 55 is opened, than those obtained when the EGR valve 55 is closed. This is because, even where the wall temperature of the intake pipe 41 is at the same level, the temperature of the intake air (i.e., a mixture of air and exhaust gas) is elevated due to heat of exhaust gas drawn into the intake pipe 41 when the EGR valve 55 is opened, and therefore evaporation of the fuel deposited on the intake passage forming members and atomization of the fuel injected from the injector 39 are promoted.

Since the fuel deposition amount fw(k) needed for calculation of the above expression (18) can be successively obtained from the above expression (17), the fuel injection amount fi(k) can be determined by substituting the fuel amount fc(k) of the expression (18) for the required fuel injection amount fc based on the in-cylinder intake air amount and obtained according to the expression (1) or (2). Thus, a means for calculating the fuel injection amount fi(k) by utilizing the above expression (18) provides "fuel injection amount determining unit".

Method of Executing Motoring

The fuel injection amount control apparatus of the present embodiment determines the fuel injection amount fi(k) in the manner as described above, and continuously operates the engine 10 by injecting the determined amount of fuel from the injector 39 into the particular cylinder that is about to enter the suction stroke. If the above-mentioned engine stop condition is satisfied at this time, the present control apparatus stops the operation of the engine 10 by stopping injection of fuel from the injector 39, and at the same time starts motoring of the engine 10 immediately after the engine stop condition is satisfied, as a particular process for making the actual amount of fuel deposited on the intake passage forming members substantially equal to zero.

More specifically, the control apparatus of the present embodiment switches the mode of the power switching mechanism P to the motoring mode immediately after the engine stop condition is satisfied, and controls the inverter I so that certain ac power for motoring is supplied to the electric motor M, thereby to motor the engine 10 at a certain rotational speed. Thus, a means for causing the electric motor M to perform motoring of the engine 10 provides "particular process executing unit".

Also, the control apparatus of the present embodiment opens the EGR valve 55 (thus making the value of the EGR valve state flag XEGR equal to "1") at the time when the engine stop condition is satisfied, and keeps the EGR valve 55 in the open state over the entire period of execution of motoring. As a result, exhaust gas that has been warmed by heat of the cylinder 21, piston 22 and the like flows into the intake pipe 41 during motoring, and consequently evaporation of the fuel deposited on the intake passage forming members is promoted.

Furthermore, each time a predetermined time elapses, the control apparatus of the present embodiment calculates (or updates) the fuel deposition amount fw(k) on the intake passage forming members with respect to each cylinder, according to the following expression (19), as the amount fw(k) decreases with time during execution of motoring after the point of time when the engine stop condition is satisfied. The calculation of the fuel deposition amount fw(k) uses, as the initial value, the fuel deposition amount fw(k+1) calculated by the fuel deposition model based on the above expression (17) at the point of time when the engine stop condition is satisfied.

$$fw(k)=P1 \cdot fw(k) \qquad (19)$$

In the above expression (19), P1 is remaining rate, namely, the proportion of the fuel remaining on the intake passage forming members after a lapse of the above-indicated predetermined time in the fuel already deposited on the intake passage forming members. Similarly to the remaining rate P used in the above expression (17), the remaining rate P1 is determined based on the SCV opening θiv, the engine speed Ne, the coolant temperature THW, the latest intake pipe pressure PMFWD for the time of closing of the intake valve 32, and a predetermined table similar to that of FIG. 13, which table is based on a function fp1 of the value of the EGR valve state flag XEGR. Like the remaining rate P, the remaining rate P1 is smaller when the EGR valve 55 is opened than that obtained when the EGR valve 55 is closed. Thus, the remaining rate P1 is reduced as the EGR valve 55 is opened during execution of motoring as described above, and therefore the fuel deposition amount fw(k) is reduced at an increased speed or rate upon each lapse of the predetermined time.

The control apparatus of the present embodiment continues motoring of the engine 10 until the fuel deposition amount fw(k) calculated according to the above expression

(19) becomes smaller than a reference amount fwref as a fixed value substantially equal to zero, with respect to all of the cylinders. Thus, the reference amount fwref is used for determining whether the fuel deposition amount fw(k) is substantially equal to zero. If the fuel deposition amount fw(k) becomes smaller than the reference amount fwref with respect to all of the cylinders, the inverter I is controlled so as to stop supplying the ac power for motoring to the electric motor M, thereby stopping motoring of the engine 10. In this manner, after the engine stop condition is satisfied, the actual amount of fuel deposited on the intake passage forming members is forcefully reduced to be substantially equal to zero.

Pre-Start Injection Process

After reducing the actual amount of fuel deposited on the intake passage forming members until it becomes substantially equal to zero in the above manner, the fuel injection amount control apparatus of the present embodiment stops injection of fuel and keeps the engine 10 stopped until the above-mentioned engine start condition is satisfied. If the engine start condition is satisfied, the control apparatus operates to inject a fuel having a pre-start injection amount fw0 determined as described below, into all of the cylinders, prior to driving of the starter S.

Figure 14A:
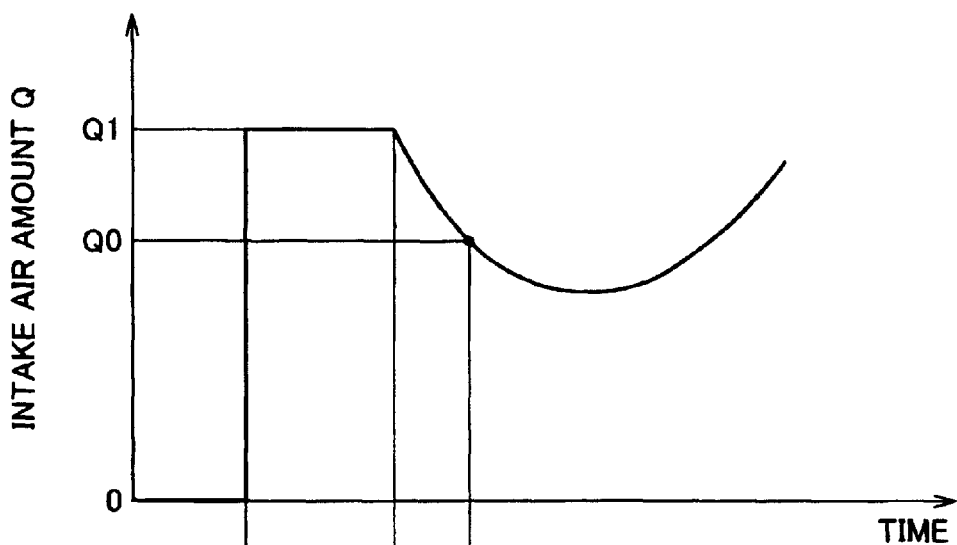
FIG. 14A is a time chart showing changes in the in-cylinder intake air amount Q per suction stroke with time during starting of the engine.
Figure 14B:
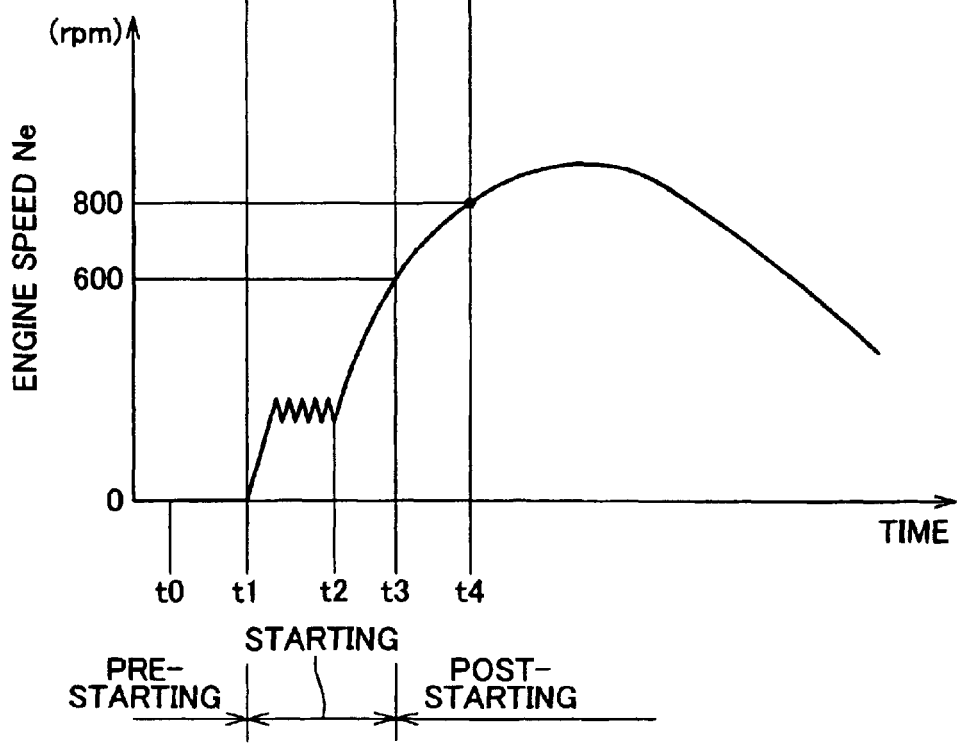
FIG. 14B is a time chart showing changes in the engine speed with time during starting of the engine.

Before explaining a method of determining the pre-start injection amount fw0, changes in the engine speed Ne with time and changes in the in-cylinder intake air amount Q per suction stroke with time, during staring of the engine 10, will be explained with reference to FIG. 14A and FIG. 14B. FIG. 14A is a time chart showing changes in the in-cylinder intake air amount Q per suction stroke with time during starting of the engine 10, and FIG. 14B is a time chart showing changes in the engine speed Ne with time during staring of the engine 10. Each of the time charts of FIG. 14A and FIG. 14B is obtained in advance through experiments, or the like.

As shown in FIG. 14B, if the ignition switch is operated from OFF to ON at time t0 and is operated from ON to START at time t1 while the engine 10 is being stopped, the engine 10 starts rotating at a certain rotational speed by utilizing the driving force of the starter S, and injection of fuel from the injector 39 and ignition by the ignition plug 37 are started at appropriate points of time. The period between time t0 and time t1 will be called "pre-start period".

At time t2, the engine 10 starts rotating (operating) spontaneously without being provided with the driving force of the starter S, and the engine speed Ne starts increasing. At time t3, the engine speed Ne reaches 600 rpm. The period between time t1 and time t3 will be called "starting period". After time t3, the engine speed Ne changes as shown in FIG. 14B. The period subsequent to time t3 will be called "post-start period".

On the other hand, as shown in FIG. 14A, the in-cylinder intake air amount Q per suction stroke of the engine 10 is kept at a predetermined value Q1 during the starting period since the throttle opening TA is kept at the maximum value (predetermined value) during this period. After starting of the engine 10 (i.e., after the engine speed Ne becomes equal to or higher than 600 rpm), the in-cylinder intake air amount Q varies as shown in FIG. 14A since the throttle valve electronic control logic A1 starts control of the throttle opening TA immediately after starting of the engine 10.

Here, a reference is to be made to the intake air amount Q0 shown in FIG. 14, which is obtained at time t4 when the engine speed Ne reaches 800 rpm after start of the engine 10. With respect to the intake air amount Q2, the required fuel injection amount (in-cylinder fuel amount) fcstart necessary for providing a certain air/fuel ratio (e.g., stoichiometric air/fuel ratio) can be calculated, and the required fuel injection amount fcstart thus calculated is stored in advance in the ROM 72. Assuming that the amount fw(k) of fuel deposited on the intake passage forming members does not change with time, namely, is in a steady state, at time t4, the fuel deposition amount fw(k) estimated at time t4 may be expressed by the following expression (20), by substituting the fuel injection amount fi(k) of the above expression (18) by the required fuel injection amount fc(k), and further substituting the required fuel injection amount fc(k) by the above-indicated required fuel injection amount fcstart.

$$fw(k)=(R/(1-P))\cdot fcstart \quad (20)$$

The control apparatus of the present embodiment uses the above expression (20) for estimating (determining) the fuel deposition amount fw0 that will be obtained at the point of time (corresponding to time t4 in FIG. 14) when the engine speed Ne reaches 800 rpm after starting, according to the following expression (21). The estimation (determination) of the fuel deposition amount fw0 is carried out immediately before start of driving of the starter S at the point of time (corresponding to time t1 in FIG. 14) when the engine start condition is satisfied.

$$fw0=(R0/(1-P0))\cdot fcstart \quad (21)$$

In the above expression (21), P0 and R0 are the remaining rate and the deposition rate which will be obtained at the point when the engine speed Ne reaches 800 rpm and are estimated at the point when the engine start condition is established. The remaining rate P0 and the deposition rate R0 are determined by setting the SCV opening θiv, engine speed Ne and the intake pipe pressure PMFWD for the time of closing of the intake valve 32 to respective predetermined values θiv0, Ne0 (800 rpm) and PMFWD0, setting the value of the EGR valve state flag XEGR to "0", and setting the coolant temperature THW to the value detected by the water temperature sensor 68 at the time when the engine start condition is satisfied, in the above-mentioned predetermined tables based on the function fp and the function fr and used for determining the remaining rate P and the deposition rate R, respectively. In other words, the remaining rate P0 and the deposition rate R0 are determined solely depending upon the actual coolant temperature THW of the engine 10 measured at the time when the engine start condition is satisfied.

Then, the control apparatus of the present embodiment drives the starter S after injecting fuel having the fuel deposition amount fw0 calculated (estimated) according to the expression (21) as the pre-start injection amount fw0, into all of the cylinders (at time t1 in FIG. 14A and FIG. 14B). The control apparatus then starts the engine 10 by injecting fuel having the fuel injection amount fi(k) calculated according to the above expression (18) from the injector 39 into a particular cylinder that is about to enter the suction stroke at appropriate points of time. Thus, a means for injecting the fuel of the pre-start injection amount fw0 from the injector 39 to all of the cylinders provides "pre-start injection commanding unit".

Here, the initial value of the fuel deposition amount fw(k) of the expression (18) that is set at the time (time t1 in FIG. 14) when injection of fuel having the fuel injection amount fi(k) calculated according to the expression (18) is started is set to the above-indicated pre-start injection amount fw0. Accordingly, the fuel injection amount fi(k) calculated according to the above expression (18) at this time is calculated so as to be reduced by an amount corresponding to (1−P) fw0.

In the manner as described above, the control apparatus of this embodiment operates to inject the fuel of the amount (pre-start injection amount fw0) that is supposed to be actually deposited on the intake passage forming members at a certain point of time after the engine start condition is satisfied and injection of the fuel is started (namely, after starting of the engine 10), into all of the cylinders, before the injection of the fuel is started (i.e., before starting of the engine 10).

Actual Operations

The operations of the fuel injection amount control apparatus of the internal combustion engine will be described with reference to FIG. 15 through FIG. 21 showing control routines or programs to be executed by the CPU 71 in the form of flowcharts. The CPU 71 starts execution of these routines at a point of time when the driver operates the ignition switch from OFF to ON.

Setting of Fuel Injection Control Execution Flag XPWR

Figure 15:
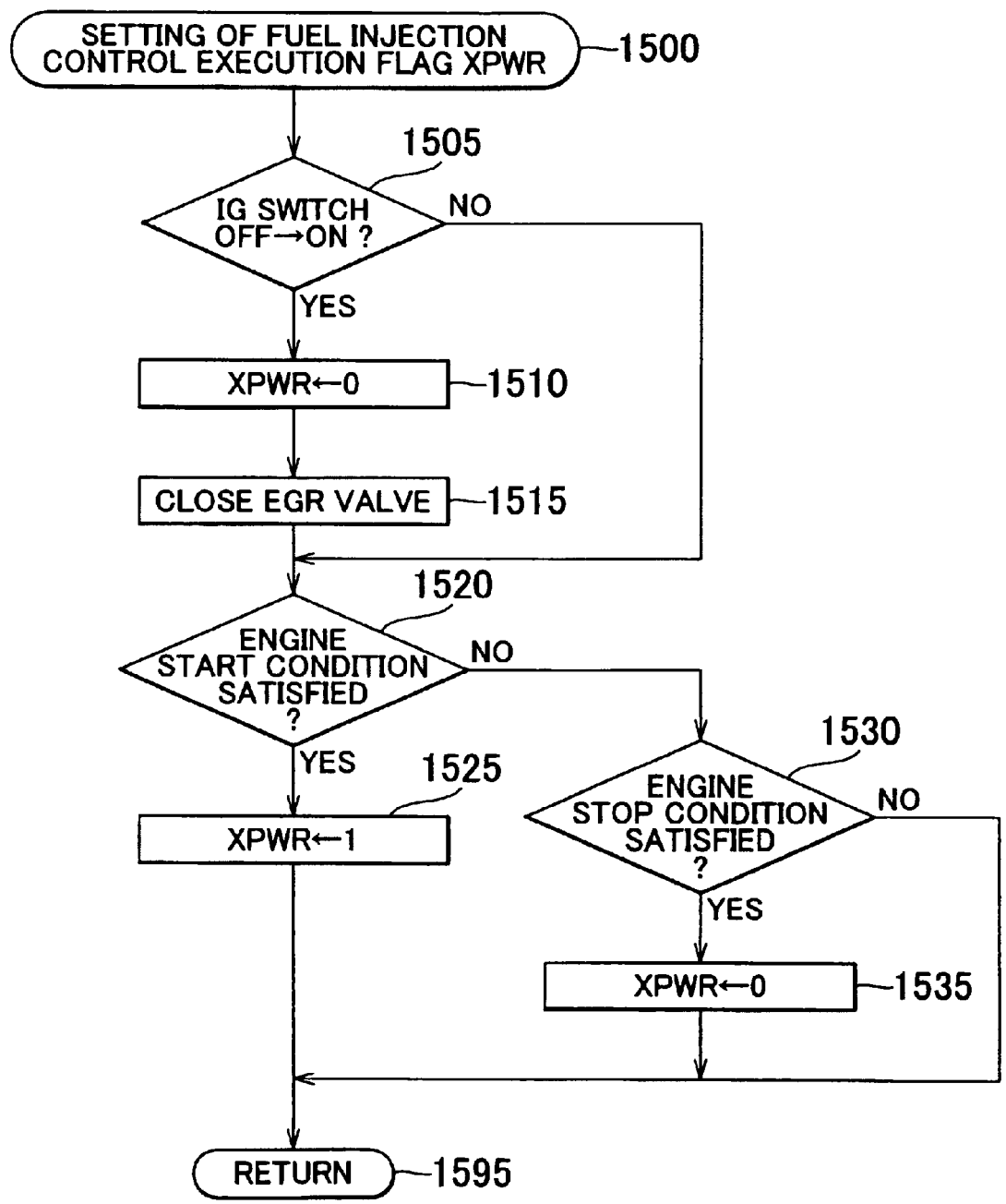
FIG. 15 is a flowchart showing a routine executed by the CPU shown in FIG. 2 for setting a value of a fuel injection control execution flag.

The CPU 71 repeatedly executes a routine as shown in FIG. 15 for setting a fuel injection execution flag XPWR, at predetermined time intervals. At an appropriate point of time, the CPU 71 starts the process of FIG. 15 at step S1500, and proceeds to step S1505 to monitor or check if the position of the ignition switch is changed from OFF to ON.

If the driver operates the ignition switch from OFF to ON while the engine 10 is being stopped, the CPU 71 makes an affirmative determination (YES) in step S1505, and proceeds to step S1510 to set the value of the fuel injection control execution flag XPWR to "0". In this connection, the fuel injection control execution flag XPWR is set at "1" when control for injecting fuel in the fuel injection amount fi(k) calculated according to the expression (18) is executed, and is set at "0" when the control for injecting the fuel in the fuel injection amount fi(k) calculated according to the expression (18) is not executed.

Subsequently, the CPU 71 proceeds to step S1515 to place the EGR valve 55 in the closed state. As a result, the value of the EGR valve state flag XEGR is set to "0". Then, the CPU 71 proceeds to step S1520, and determines whether the above-indicated engine start condition is satisfied. Since the engine start condition is not satisfied at this point of time immediately after switching of the ignition switch from OFF to ON, the CPU 71 makes a negative determination (NO) in step S1520, and proceeds to step S1530 to determine whether the engine stop condition is satisfied. Since the engine stop condition is not satisfied at this point of time, the CPU 71 makes a negative determination (NO) in step S1530, and proceeds to step S1595 to finish the current cycle of the routine.

Thereafter, the CPU 71 repeatedly executes the process of steps S1500, S1505, S1520, S1530 and S1595 until the engine start condition is satisfied. If the driver operates the ignition switch from ON to START, the CPU 71 makes an affirmative determination (YES) in step S1520, and proceeds to step S1525 to set the fuel injection control execution flag XPWR to "1". Then, the CPU 71 proceeds to step S1595 to finish the current cycle of the routine. Thereafter, the CPU 71 repeatedly executes the process of steps S1500, S1505, S1520, S1530 and S1595 until the engine stop condition is satisfied.

Execution of Pre-Start Injection Process

Figure 16:
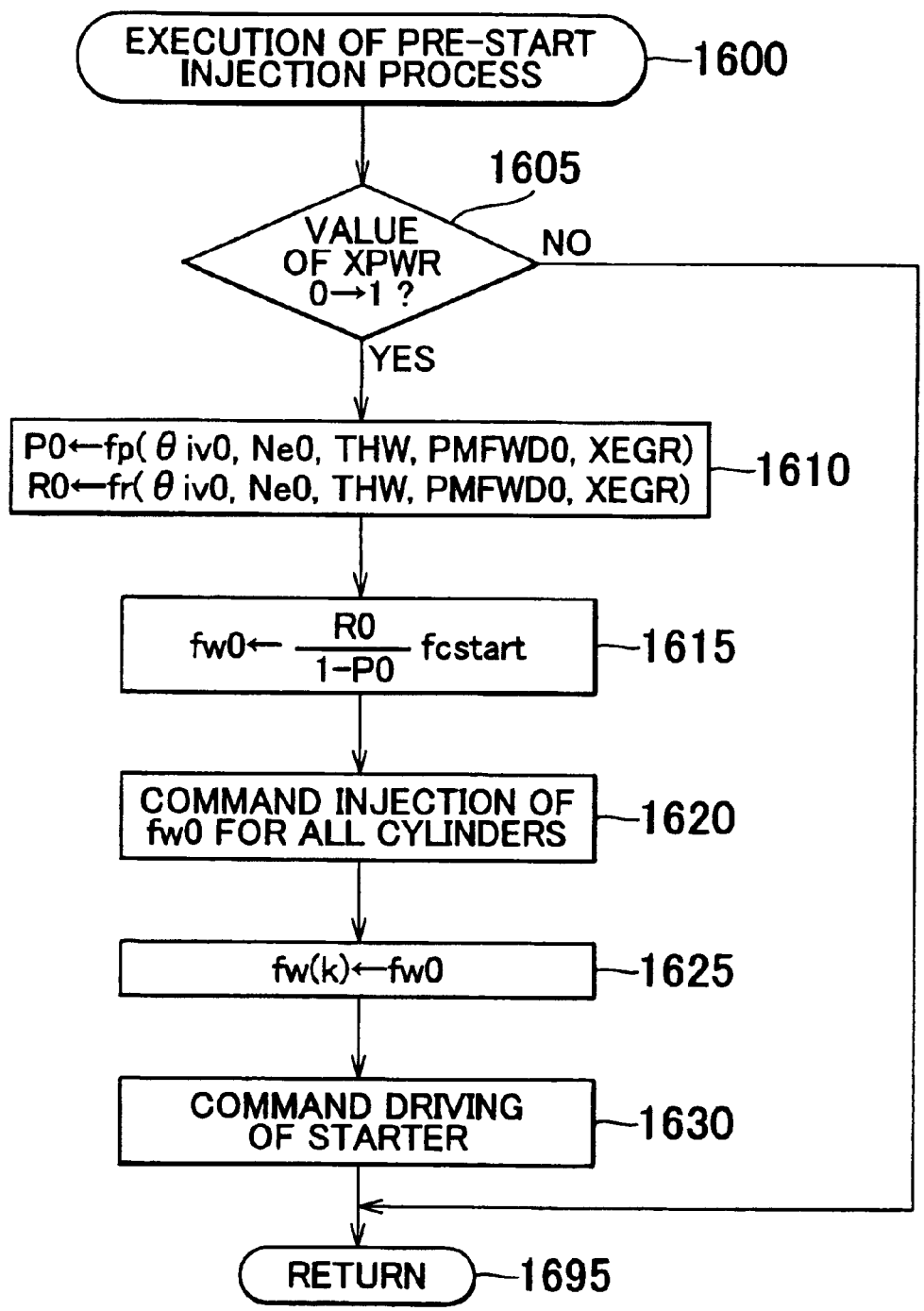
FIG. 16 is a flowchart showing a routine executed by the CPU shown in FIG. 2 for performing a pre-start injection process.

The CPU 71 repeatedly executes a routine as shown in FIG. 16 for executing a pre-start injection process at predetermined time intervals. At an appropriate point of time, the CPU 71 starts the process of FIG. 16 at step S1600, and monitors or checks if the value of the fuel injection control execution flag XPWP has just been changed from "0" to "1". If the value of the fuel injection control execution flag XPWR is not changed, the CPU 71 proceeds from step S1605 directly to step S1695 to finish the current cycle of the routine.

If the present time is immediately after the driver operated the ignition switch from ON to START (namely, immediately after the engine start condition was satisfied), it is immediately after the value of the fuel injection control execution flag XPWR was changed from "0" to "1" in step S1525 of FIG. 15, and therefore the CPU 71 makes an affirmative determination (YES) in step S1605. The CPU 71 then proceeds to step S1610 to determine the remaining rate P0 and the deposition rate R0 that will be established at the time when the engine speed Ne reaches 800 rpm, which rates P0, R0 are used in the above expression (21) and estimated at the time when the engine start condition is established. The remaining rate P0 and the deposition rate R0 are determined based on the coolant temperature THW detected at the present time by the temperature sensor 68, and predetermined tables based on the functions fp and fr described in the block of step S1610 in FIG. 16.

The CPU 71 then proceeds to step S1615 to calculate the pre-start injection amount fw0, based on the remaining rate P0 and the deposition rate R0 determined in step S1610, the required fuel injection amount fcstart stored in advance in the ROM 72, and the expression corresponding to the right-hand side of the expression (21) and described in the block of step S1615 in FIG. 16.

Subsequently, the CPU 71 proceeds to step S1620 to command the injectors 39 of all of the cylinders to inject fuel of the pre-start injection amount fw0 calculated in step S1615. After setting the initial value of the fuel deposition amount fw(k) to the pre-start injection amount fw0 in the next step S1625, the CPU 71 proceeds to step S1630 to generate a command to drive the starter S, and then finish the current cycle of the routine. Thereafter, the CPU 71 makes a negative determination (NO) in step S1605, and immediately proceeds to step S1695 to finish the routine.

With step S1630 thus executed, the starter S is kept driven while the driver holds the ignition switch in the "START" position. As a result, the crankshaft 24 of the engine 10 starts rotating at a certain rotational speed by utilizing the driving force of the starter S, and ignition by the ignition plug 37 for a certain cylinder is started each time the crank angle of the cylinder becomes equal to a predetermined crank angle, through execution of a separate routine (not shown) repeated at certain time intervals. The ignition by the ignition plug 37 is continuously carried out until the engine stop condition is satisfied.

Fuel Injection Control For Starting Period

Figure 17:
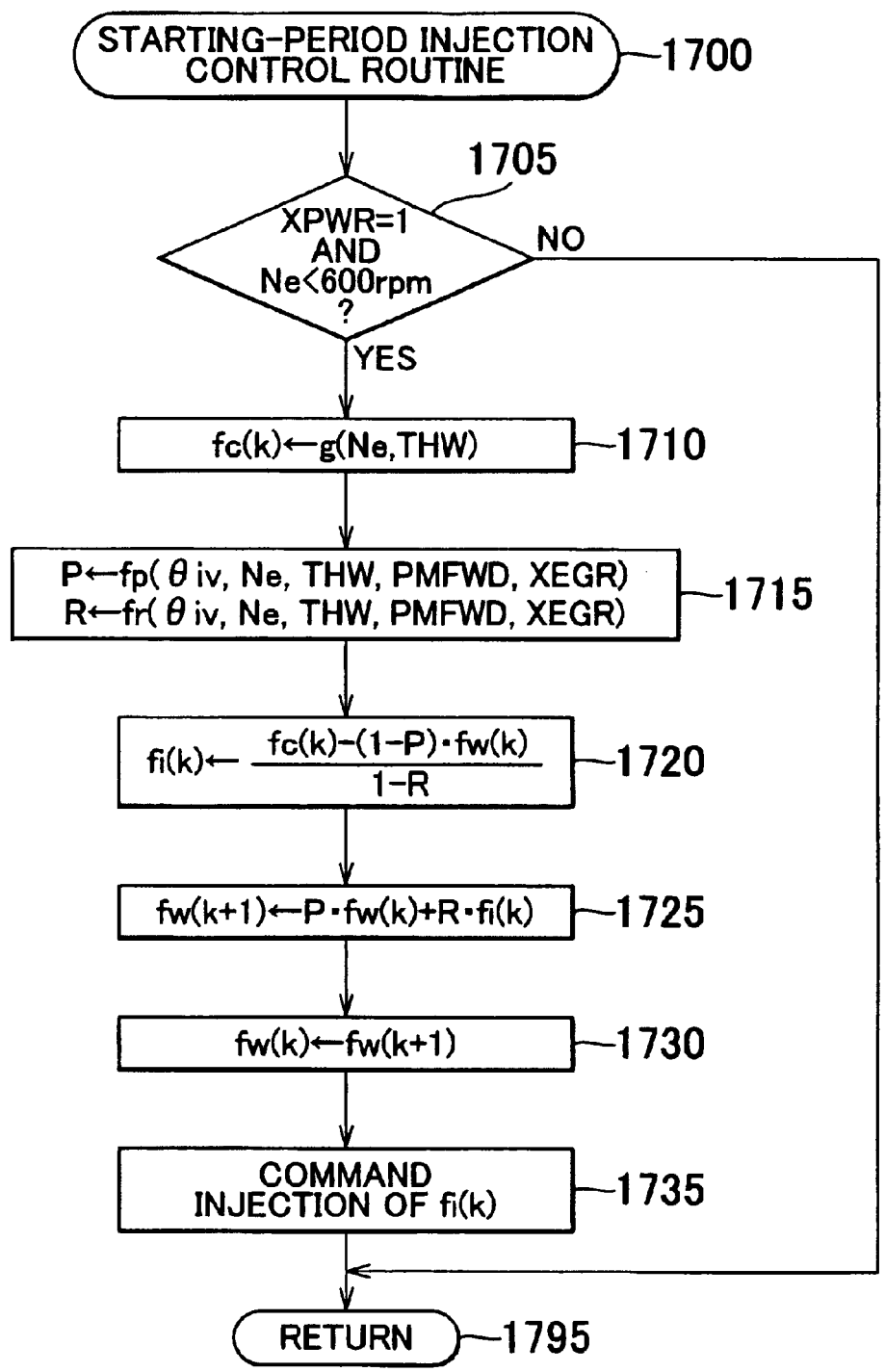
FIG. 17 is a flowchart showing a routine executed by the CPU shown in FIG. 2 for performing starting-period injection control.

The CPU 71 repeatedly executes a routine as shown in FIG. 17 for executing starting-period fuel injection control each time the crank angle of a particular cylinder becomes equal to a predetermined crank angle (e.g., BTDC 90° CA) before the top dead center of the suction stroke of the cylinder. When the crank angle of a certain cylinder becomes equal to the predetermined crank angle, therefore, the CPU 71 starts the process of FIG. 17 at step S1700, and proceeds to step S1705 to determine whether the value of the fuel injection control execution flag XPWR is equal to "1", and the engine speed Ne is lower than 600 rpm (namely, the engine 10 is in the starting period). If the value of the fuel injection control execution flag XPWR is equal to "0" or the engine speed Ne is equal to or higher than 600 rpm (namely, the engine is in the post-start period) even if the value of the fuel injection control execution flag XPWR is equal to "1", the CPU 71 proceeds from step S1705 directly to step S1795 to finish the current cycle of the routine.

If the present time is immediately after the engine 10 starts rotating by the driving force of the starter S through the operation of step S1630 of FIG. 16, the engine speed Ne is lower than 600 rpm, and therefore the CPU 71 makes an affirmative determination (YES) in step S1705, and proceeds to step S1710. In step S1710, the CPU 71 calculates the required fuel injection amount fc(k) of the current cycle for the starting period, based on the engine speed Ne detected at the present time, the coolant temperature THW, and a table stored in advance in the ROM 72 and based on a function g of the engine speed Ne and the coolant temperature THW for determining the required fuel injection amount for the starting period.

Subsequently, the CPU 71 proceeds to step S1715 to determine the current deposition rate R, based on the SCV opening θiv detected by the SCV opening sensor 65, the engine speed Ne based on the output signal of the crank position sensor 67, the coolant temperature THW detected by the water temperature sensor 68, the intake pipe pressure PMFWD calculated according to the expression (3), and the value of the EGR valve state flag XEGR (SCV opening, Ne, THW, PMFWD and XEGR value are generally called "argument parameters"), and a table stored in advance in the ROM 72, which specifies the relationship between the argument parameters and the deposition rate R. Also, the CPU 71 determines the remaining rate P based on the above-indicated argument parameters, and a table stored in advance in the ROM 72, which specifies the relationship between the argument parameters and the remaining rate P. The above-indicated intake pipe pressure PMFWD is calculated according to a routine (not shown) that is repeatedly executed at certain time intervals, by using the models as shown in FIG. 8.

Subsequently, the CPU 71 proceeds to step S1720 to calculate the fuel injection amount fi(k) of this cycle according to the expression described in the block of step S1720 in FIG. 17 and obtained by modifying the above expression (18), based on the required fuel injection amount fc(k) obtained in the above step S1710, the deposition rate R and the remaining rate P determined in the above step S1715, and the initial value (pre-start injection amount fw0) of the fuel deposition amount fw(k) set in step S1625 of FIG. 16. In the next step S1725, the fuel deposition amount fw(k+1) for use in the next cycle is calculated according to the above-indicated expression (17).

Next, the CPU 71 proceeds to step S1730 to replace the fuel deposition amount fw(k+1) obtained in step S1725 by the fuel deposition amount fw(k) for calculation in the next cycle. In the next step S1735, the CPU 71 sends a drive signal to the injector 39 associated with the particular cylinder so as to cause the injector 39 to inject fuel of the fuel injection amount fi(k) of this cycle determined in step S1720. The CPU 71 then proceeds to step S1795 to finish the current cycle of the routine.

In the manner as described above, the fuel injection amount for the starting period with respect to the particular cylinder is determined based on the fuel deposition amount and the required fuel injection amount (in-cylinder fuel amount), and the fuel of the fuel injection amount for the starting period is injected from the injector 39 associated with the particular cylinder until the engine speed Ne reaches 600 rpm. The CPU 71 also executes a routine similar to the routine of FIG. 17 in similar timing, with respect to the other cylinders.

Throttle Valve Control

Figure 18:
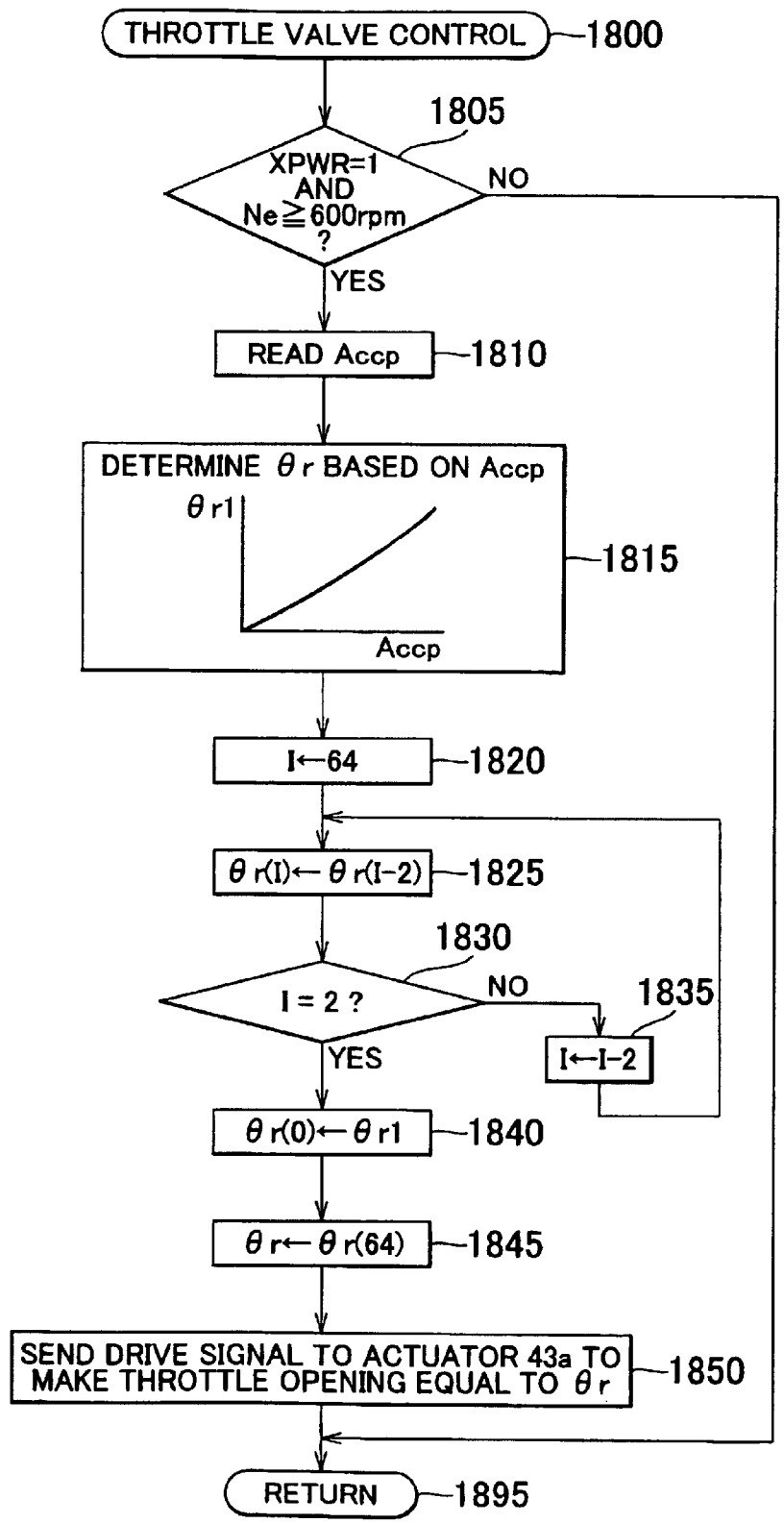
FIG. 18 is a flowchart showing a routine executed by the CPU shown in FIG. 2 for controlling a throttle opening.

The CPU 71 repeatedly executes a routine as shown in FIG. 18 for executing throttle valve control at predetermined time intervals (e.g., 2 msec). The CPU 71 starts the process of FIG. 18 from step S1800 at an appropriate point of time, and proceeds to step S1805 to determine whether the value of the fuel injection control execution flag XPWR is equal to "1", and the engine speed Ne is equal to or higher than 600 rpm (namely, the engine 10 is in the post-start period). If the fuel injection control execution flag XPWR is equal to "0", or the engine speed Ne is lower than 600 rpm (namely, the engine 10 is in the starting period) even if the fuel injection control execution flag XPWR is equal to "1", the CPU 71 proceeds from step S1805 directly to step S1895 to finish the current cycle of the routine.

If the engine speed Ne starts increasing and becomes equal to or higher than 600 rpm (i.e., the engine 10 enters the post-start period) after repeated execution of the routine of FIG. 17, the CPU 71 makes an affirmative determination (YES) in step S1805, and proceeds to step S1810 to read the accelerator pedal operation amount Accp. The CPU 71 then proceeds to step S1815 to obtain the provisional target throttle opening θr1 based on the accelerator pedal operation amount Accp read in step S1810, by using the same table as that shown in FIG. 9.

The CPU 71 then sets variable I to "64" in step S1820, and stores a value of θr(I−2) in the location of a stored value θr(I) in step S1825. With the variable I being equal to "64" at the present time, the stored value θr(62) is stored in the location of the stored value θr(64). The CPU 71 then proceeds to step S1830 to determine whether the variable I becomes equal to "2". Since the current value of the variable I is "64", the CPU 71 makes a negative determination (NO) in step S1830, and proceeds to step S1835 to reduce the value of the variable I by "2". Then, the CPU 71 returns to step S1825. Since the variable I is now equal to "62", the stored value θr(60) is stored in the location of the stored value θr(62) in step S1825. This process is repeatedly executed until the value of the variable I becomes equal to "2".

If the value of the variable I becomes equal to "2" after repeated execution of step S1835, the CPU 71 makes an affirmative determination (YES) in step S1830, and proceeds to step S1840 to store the current provisional target throttle opening θr1 obtained in the above step S1815, in the location of the stored value θr(0). In this manner, the provisional target throttle openings θr(I) (I=64, 62, . . . , 4, 2, 0) obtained I msec (0 msec≦I msec≦64 msec) before the present point of time are stored in the RAM 73.

Next, the CPU 71 proceeds to step S1845 to set the stored value θr(64) as the final target throttle opening θr. In the following step S1850, the CPU 71 sends a drive signal to the throttle valve actuator 43a so that the actual throttle opening becomes equal to the target throttle opening θr. After execution of step S1850, the current cycle of the routine is finished in step S1895.

Following the above cycle, the process of the above-described routine is executed at intervals of 2 msec.

Consequently, the actual throttle opening is controlled to be equal to the target throttle opening θr based on the accelerator pedal operation amount Accp detected 64 msec ahead of the present time. In this manner, the throttle valve opening TAS for the time of closing of the intake valve 32 can be estimated by the electronically controlled throttle model M1

Intake Valve Opening/Closing Timing Control and SCV Opening Control

Figure 19:
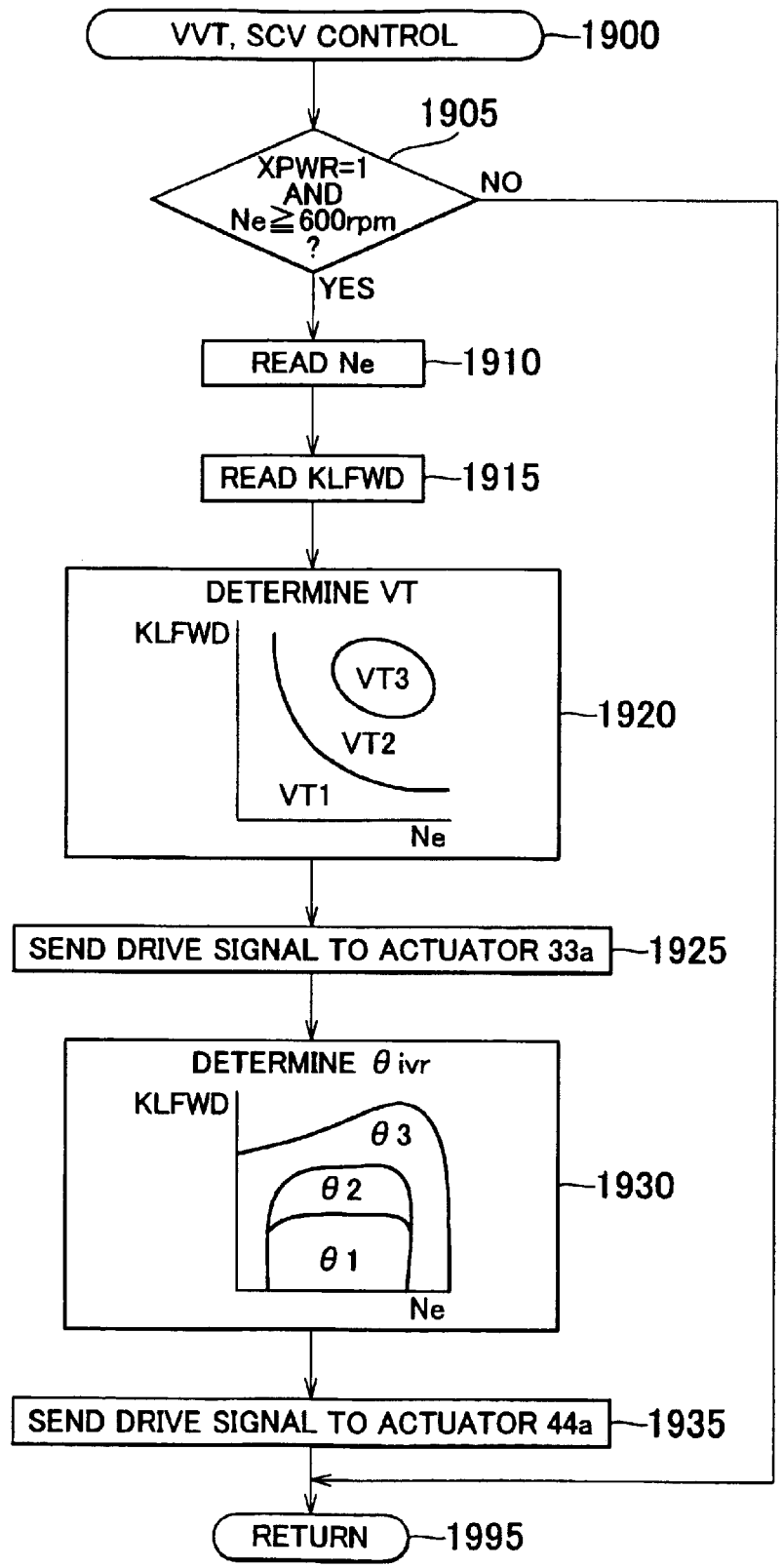
FIG. 19 is a flowchart showing a routine executed by the CPU shown in FIG. 2 for controlling intake valve opening/closing timing and a SCV opening.

The CPU 71 repeatedly executes intake valve opening/closing timing control and SCV opening control as shown in FIG. 19 at predetermined time intervals (e.g., 2 msec). The CPU 71 starts the process of FIG. 19 from step S1900 at an appropriate time, and proceeds to step S1905 to determine whether the value of the fuel injection control execution flag XPWR is equal to "1" and the engine speed Ne is equal to or higher than 600 rpm (namely, the engine 10 is in the post-start period). If the value of the fuel injection control execution flag XPWR is equal to "0", or the engine speed Ne is lower than 600 rpm (namely, the engine 10 is in the starting period) even if the value of the fuel injection control execution flag XPWR is equal to "1", the CPU 71 proceeds from step S1905 directly to step S1995 to finish the current cycle of the routine.

Since the engine speed Ne is equal to or higher than 600 rpm (the engine 10 is in the post-start period) at the present time, the CPU 71 makes an affirmative determination (YES) in step S1905, and proceeds to step S1910 to read the engine speed Ne based on the output signal of the crank position sensor 67. In the next step S1915, the CPU 71 reads value KLFWD (i.e., engine load) equivalent to the in-cylinder intake air amount as described above. The value KLFWD equivalent to the in-cylinder intake air amount is obtained by a routine (not shown) repeatedly executed at predetermined time intervals according to the above-described method (or the models shown in FIG. 8) of determining the required injection amount.

The CPU 71 then proceeds to step S1920 to determine the opening/closing timing (advance amount) VT of the intake valve 32, based on the table shown in the block of step S1920 in FIG. 19, the engine speed Ne read in step S1910 and the value KLFWD (read in step S1915) equivalent to the in-cylinder intake air amount. In the following step S1925, the CPU 71 sends a drive signal to the actuator 33a so that the actual advance amount becomes equal to the thus determined advance amount VT. In the table shown in the block of step S1920, the advance amount VT increases in the order of VT1, VT2 and VT3.

Subsequently, the CPU 71 proceeds to step S1930 to determine the target SCV opening θivr, based on the table shown in the block of step S1930 in FIG. 19, the engine speed Ne read in step S1910 and the value KLFWD (read in step S1915) equivalent to the in-cylinder intake air amount. In the following step S1935, the CPU 71 sends a drive signal to the actuator 44a so that the actual SCV opening becomes equal to the thus determined target SCV opening θivr. In the table shown in the block of step S1930, the SCV opening increases in the order of θ1, θ2 and θ3.

Following the above cycle of the routine, the CPU 71 executes the above-described process at intervals of 2 msec. In this manner, the actual advance amount of the intake valve opening/closing timing and the actual SCV opening are changed in accordance with the engine speed Ne and the value KLFWD equivalent to the in-cylinder intake air amount.

Post-Start Fuel Injection Control

Figure 20:
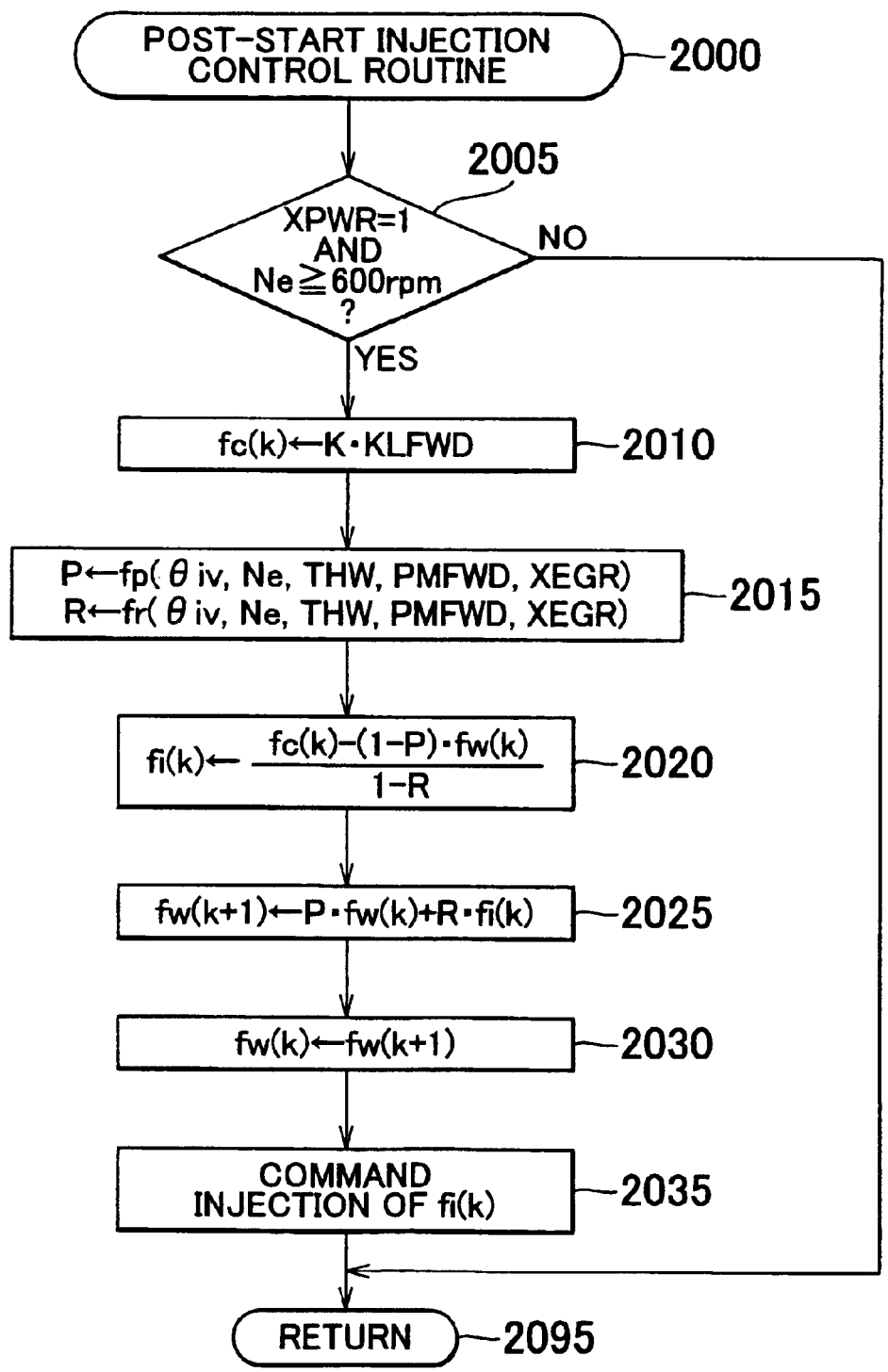
FIG. 20 is a flowchart showing a routine executed by the CPU shown in FIG. 2 for performing post-start injection control.

The CPU 71 repeatedly executes a routine for performing post-start fuel injection control as shown in FIG. 20 each time the crank angle of a particular cylinder becomes equal to a predetermined crank angle (e.g., BTDC 90° CA) before the top dead center of the suction stroke of the cylinder. When the crank angle of a certain cylinder becomes equal to the predetermined crank angle, the CPU 71 starts the process of FIG. 20 from step S2000, and proceeds to step S2005 to determine whether the value of the fuel injection control execution flag XPWR is equal to "1", and the engine speed Ne is equal to or higher than 600 rpm (namely, the engine 10 is in the post-start period). If the fuel injection control execution flag XPWR is equal to "0", or the engine speed Ne is lower than 600 rpm (namely, the engine 10 is in the starting period) even if the fuel injection control execution flag XPWR is equal to 1, the CPU 71 proceeds from step S2005 directly to step S2095 to finish the current cycle of the routine.

Since the engine speed Ne is equal to or higher than 600 rpm (namely, the engine 10 is in the post-start period) at the present time, the CPU 71 makes an affirmative determination (YES) in step S2005, and proceeds to step S2010 to calculate the required fuel injection amount fc(k) of this cycle based on the value KLFWD equivalent to the in-cylinder intake air amount for the time of closing of the intake valve 32, which value is separately calculated according to the models shown in FIG. 8, and the expression described in the block of step S2010 in FIG. 20, which is based on the right-hand side of the above-indicated expression (1).

Subsequently, the CPU 71 proceeds to step S2015 to determine the current deposition rate R, based on the above-mentioned argument parameters and the table that is stored in advance in the ROM 72 and specifies the relationship between the argument parameters and the deposition rate R. Also, the CPU 71 determines the current remaining rate P, based on the argument parameters and the table that is stored in advance in the ROM 72 and specifies the relationship between the argument parameters and the remaining rate P.

The CPU 71 then proceeds to step S2020 to calculate the fuel injection amount fi(k) of this cycle based on the expression described in the block of step S2020 in FIG. 20 and derived from the above expression (18), the required fuel injection amount fc(k) obtained in the above step S2010, the deposition rate R and remaining rate P determined in the above step S2015, and the latest fuel deposition amount fw(k) updated in step S1730 of FIG. 17. In the following step S2025, the fuel deposition amount fw(k+1) for the next cycle is calculated according to the expression (17).

Then, the CPU 71 proceeds to step S2030 to set the fuel deposition amount fw(k+1) obtained in step S2025 as the fuel deposition amount fw(k) for calculation in the next cycle, and proceeds to step S2035 to send a drive signal to the injector 39 associated with the particular cylinder so as to inject the fuel in the fuel injection amount fi(k) determined in this cycle in step S2020. The CPU 71 then proceeds to step S2095 to finish the current cycle of the routine.

In the manner as described above, the fuel injection amount for the particular cylinder in the post-start period is determined based on the fuel deposition amount and the required fuel injection amount (in-cylinder fuel amount), and the fuel having the fuel injection amount for the post-start period is injected from the injector 39 associated with the particular cylinder while the engine speed Ne is equal to or higher than 600 rpm. It is to be understood that the CPU executes a routine similar to that of FIG. 20 in similar timing with respect to the other cylinders.

Execution of Motoring

Figure 21:
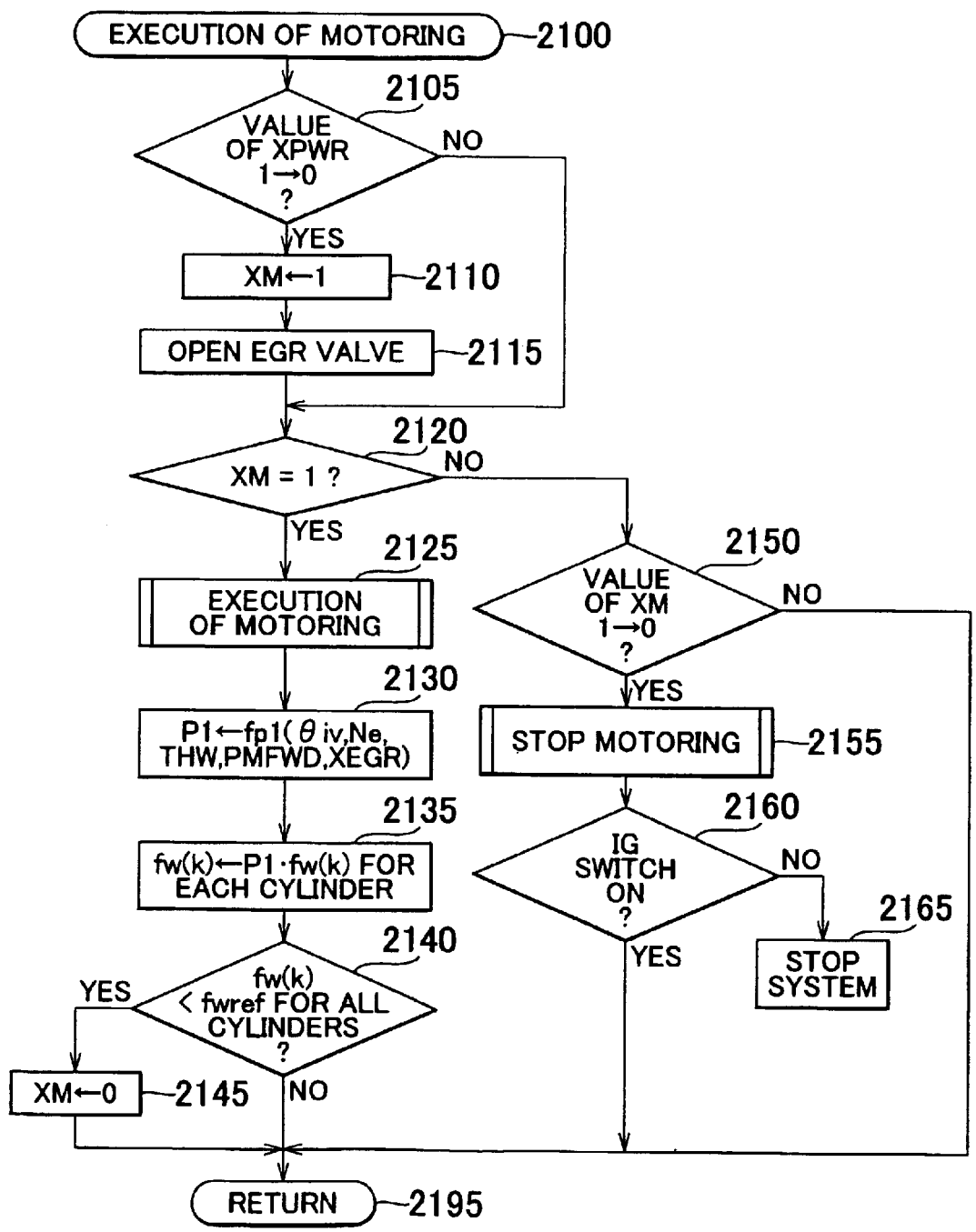
FIG. 21 is a flowchart showing a routine executed by the CPU shown in FIG. 2 for performing motoring of the engine.

The CPU 71 executes a routine as shown in FIG. 21 for performing motoring of the engine 10 at predetermined time intervals (e.g., 2 msec). The CPU 71 starts the process of FIG. 21 from step S2100 at an appropriate time, and proceeds to step S2105 to determine whether the value of the fuel injection control execution flag XPWR has changed from "1" to "0".

Suppose the ignition switch is kept in the ON position with the engine 10 being operated, and the CPU 71 has just switched the mode of the power switching mechanism P from the engine running mode or the motor assist running mode to the motor running mode, depending upon the running conditions of the vehicle. Since an engine stop condition is satisfied at this point of time, the CPU 71 makes an affirmative determination (YES) in step S1530 of FIG. 15, and changes the value of the fuel injection control execution flag XPWR from "1" to "0". As a result of this change, the CPU 71 makes a negative determination (NO) in step S2005 of FIG. 20, and directly proceeds to step S2095. As a result, the injection of the fuel from the injector 39 is stopped, and ignition by the ignition plug 37 is stopped, whereby the operation (or driving) of the engine 10 is stopped. Meanwhile, the vehicle runs with its front wheels driven by the driving force of the electric motor M.

If the CPU 71 proceeds to step S2105 of FIG. 21 at this time, namely, immediately after the value of the fuel injection control execution flag XPWR was changed from "1" to "0", the CPU 71 makes an affirmative determination (YES) in step S2105 and proceeds to step S2110 to set a value of a motoring execution flag XM to "1". The motoring execution flag XM is set at "1" when motoring by the electric motor M is carried out, and is set at "0" when motoring by the electric motor M is not carried out.

Subsequently, the CPU 71 proceeds to step S2115 to place the EGR valve 55 in the open state. As a result, the value of the EGR valve state flag XEGR becomes equal to "1". With the EGR valve 55 thus opened, exhaust gas warmed by heat of the cylinder 21, piston 22 and the like that have already been warned up flows into the intake pipe 41 over the entire period of execution of motoring as described later. The CPU 71 then proceeds to step S2120 to determine whether the value of the motoring execution flag XM is equal to "1". Since the value of the motoring execution flag XM is equal to "1" at this point of time, the CPU 71 makes an affirmative determination (YES) in step S2120, and proceeds to step S2125 to cause the electric motor M to perform motoring of the engine 10. Thus, the engine 10 starts rotating at a certain rotational speed while injection of fuel is being stopped.

Subsequently, the CPU 71 proceeds to step S2130 to determine the remaining rate P1 during motoring, based on the current SCV opening θiv detected by the SCV opening sensor 65, the engine speed Ne based on the output signal of the crank position sensor 67, the coolant temperature THW detected by the water temperature sensor 68, the latest intake pipe pressure PMFWD for the time of closing of the intake valve calculated according to the above expression (3), and a predetermined table similar to the table of FIG. 13 based on the function fp1 of the value ("1" at this point) of the EGR valve state flag XEGR. In the following step S2135, the fuel deposition amount fw(k) that decreases with time during execution of motoring is determined (updated) with respect to each cylinder, based on the latest amount fw(k) of fuel deposited on the intake passage forming members at the time when the engine stop condition was satisfied, the remaining rate P1 determined in step S2130, and the expression described in the block of step S2135 in FIG. 21 and based on the right-hand side of the expression (19). Until the engine stop condition was satisfied, the fuel deposition amount fw(k) had been calculated (updated) in step S2030 of FIG. 20.

Next, the CPU 71 proceeds to step S2140 to determine whether the fuel deposition amount fw(k) is smaller than the reference amount fwref (for determining whether the fuel deposition amount is zeroed) with respect to all of the cylinders. At this point of time, namely, immediately after motoring is started, the fuel deposition amount fw(k) is not smaller than the reference amount fwref, and therefore the CPU 71 makes a negative determination (NO) in step S2140, and proceeds to step S2195 to finish the present cycle of the routine.

Subsequently, the CPU 71 repeatedly executes the process of steps S2100, S2105, S2120–S2140 and S2195 to gradually reduce the fuel deposition amount fw(k) at the predetermined time intervals until the fuel deposition amount fw(k) becomes smaller than the reference amount fwref with respect to all of the cylinders. If the fuel deposition amount fw(k) becomes less (smaller) than the reference amount fwref for all of the cylinders, the CPU 71 makes an affirmative determination (YES) in step S2140, and proceeds to step S2145 to set the value of the motoring execution flag XM to "0". The CPU 71 then proceeds to step S2195 to finish the present cycle of the routine.

When the CPU 71 proceeds to step S2120 after this point of time, the CPU 71 makes a negative determination (NO) in step S2120, and proceeds to step S2150. If the present time is immediately after the value of the motoring execution flag XM was changed from "1" to "0" in step S2145, the CPU 71 makes an affirmative determination (YES) in step S2150, and proceeds to step S2155 to stop motoring by the electric motor M.

The CPU 71 then proceeds to step S2160 to determine whether the ignition switch is ON. Since the ignition switch is kept ON at the present time as explained above, the CPU 71 makes an affirmative determination (YES) in step S2160, and proceeds to step S2195 to finish the current cycle of the routine. Thereafter, the CPU 71 makes a negative determination (NO) in step S2105, makes negative determinations (NO) in step S2120 and S2150, and proceeds to step S2195 to finish the present cycle of the routine.

In the above manner, the control apparatus of this embodiment makes the amount of fuel deposited on the intake passage forming members of each cylinder substantially equal to zero by effecting motoring of the engine 10 by means of the electric motor M after the engine stop condition is satisfied. Thereafter, the CPU 71 stops motoring, and keeps the engine 10 stopped until an engine start condition is satisfied in the future.

The following explanation is concerned with the situation that, while the ignition switch is kept ON and the power switching mechanism P is in the motor running mode (in which the engine 10 is stopped, and the vehicle runs with the driving power of the electric motor M), the CPU 71 switches the mode of the power switching mechanism P from the motor running mode to the engine running mode or the motor assist running mode. Since an engine start condition is satisfied at this point of time, the CPU 71 makes an affirmative determination (YES) in step S1520 of FIG. 15, and proceeds to step S1525 to change the value of the fuel injection control execution flag XPWR from "0" to "1".

As a result, the CPU 71 executes the above-described pre-start injection process only once prior to start (re-start)

of the engine 10 according to the routine of FIG. 16, and executes the starting control according to the injection control routine of FIG. 17 for the starting period. After completion of the starting control, the CPU 71 repeatedly executes the respective routines of FIG. 18–FIG. 20 after re-start of the engine 20, so as to continuously operate the engine 10 again.

If the driver operates the ignition switch from ON to OFF while the engine 10 is being operated or driven, an engine stop condition is satisfied at this point of time, and the CPU 71 makes an affirmative determination (YES) in step S1530 of FIG. 15, and proceeds to step S1535 to change the value of the fuel injection control execution flag XPWR from "1" to "0". In this case, the CPU 71 makes a negative determination (NO) in step S2005 of FIG. 20, and proceeds directly to step S2095. As a result, the injection of fuel from the injector 39 is stopped, and the ignition by the ignition plug 37 is stopped, whereby the operation (driving) of the engine 10 is stopped again.

With the fuel injection control execution flag XPWR thus changed from "1" to "0", the CPU 71 causes the electric motor M to perform motoring of the engine 10 again according to the motoring execution routine of FIG. 21, so that the amount of fuel deposited on the intake passage forming members is made substantially equal to zero with respect to all of the cylinders. Then, motoring of the engine 10 is stopped in step S2155. Since the ignition switch is OFF at this time, the CPU 71 makes a negative determination (NO) in step S2160, and proceeds to step S2165 to stop the whole system to which the engine 10 including the fuel injection amount control apparatus is applied. Thus, execution of all of the routines shown in FIG. 15 through FIG. 21 is stopped.

In the manner as described above, each time an engine start condition is satisfied, the fuel injection amount control apparatus of the present embodiment executes the pre-start injection process only once before start of the engine 10. Also, each time an engine stop condition is satisfied, the control apparatus executes motoring of the engine 10 by using the electric motor M until the amount (estimated value) of the fuel deposited on the intake passage forming members is made substantially equal to zero with respect to all of the cylinders.

As explained above, in the fuel injection amount control apparatus of the engine according to the present embodiment of the invention, motoring of the engine by the electric motor M is carried out so as to produce air flow in the intake passage immediately after a certain engine stop condition is satisfied, so that the fuel deposited on the intake passage forming members is forcefully released from the intake passage forming members by utilizing the air flow, and the actual amount of the fuel deposited on the intake passage forming members is made substantially equal to zero (i.e., less than the reference amount fwref) with respect to all of the cylinders. Then, immediately before injection of fuel for starting (re-starting) of the engine based on the above expression (18) is started with a certain engine start condition being satisfied, namely, immediately before starting (re-starting) of the engine, the fuel having the pre-start injection amount fw0 that is supposed to be actually deposited on the intake passage forming members at a certain point of time (at a point when the engine speed Ne reaches 800 rpm) after the start of the injection of the fuel (after starting of the engine) is injected in advance into all of the cylinders, and thereafter injection of fuel for re-starting is started. At this time, estimation of the fuel deposition amount by the fuel deposition amount estimating unit is started in the condition that the initial value of the fuel deposition amount fw(k) estimated by the fuel deposition amount estimating unit is set to the above-indicated pre-start injection amount fw0. Thus, the estimated value fw(k) of the amount of fuel deposited on the intake passage forming members upon re-start of the engine 10 and the actual value of the fuel deposition amount can be surely made equal to each other. Consequently, the fuel injection amount fi(k) can be set to an appropriate value to provide a target (desired) air/fuel ratio during re-starting of the engine 10, thus assuring good starting characteristics upon re-start of the engine and a reduced amount of emissions.

Since the EGR valve 55 is kept in the open state during execution of motoring of the engine 10, a part of the high-temperature exhaust gas is introduced into the intake passage during motoring, and the temperature of the intake air (i.e., a mixture of air and exhaust gas) that passes over the fuel deposited on the intake passage forming members is elevated. As a result, evaporation of the fuel deposited on the intake passage forming members is promoted, and therefore the time it takes from the start of motoring to the time when the actual fuel deposition amount becomes substantially equal to zero can be shortened. Consequently, the time required for performing motoring by the electric motor M can be reduced, resulting in a reduction in the energy consumption by the electric motor M.

As described above, after the fuel of the pre-start injection amount fw0 is injected in advance with respect to all of the cylinders, the initial value of the fuel deposition amount fw(k) estimated by the fuel deposition amount estimating unit is set to the pre-start injection amount fw0. Thereafter, injection of fuel for starting (re-starting) of the engine 10 based on the above expression (18) is started. Accordingly, the amount fi(k) of fuel injected from the fuel injecting unit (injector 39) can be reduced by the amount (1−P)·fw0 of fuel released from the intake passage forming members and introduced into the cylinder, out of the pre-start injection amount fw0 deposited on the intake passage forming members at the time of re-start of the engine 10. Thus, the estimated value fw(k) of the amount of fuel deposited on the intake passage forming members at the time of re-start of the engine 10 and the actual value of the fuel deposition amount can be made substantially equal to each other, and the amount fi(k) of the fuel injected from the fuel injecting unit can be reduced. Consequently, the fuel injection amount fi(k) can be set to an appropriate value to provide a target (or desired) air/fuel ratio during re-starting of the engine 10. In addition, the amount of unburned components, such as HC and CO, in the exhaust gas can be reduced.

It is to be understood that the invention is not limited to the illustrated embodiment, but may be embodied with various modifications, changes or improvements within the scope of the invention. In the illustrated embodiment, the amount of fuel deposited on the intake passage forming members is forcefully made substantially equal to zero by motoring the engine 10 with the electric motor after an engine stop condition is satisfied. However, the fuel deposition amount may be forcefully made substantially equal to zero by heating the intake passage forming members by suitable heating means for heating the intake passage forming members, thereby promoting evaporation of the fuel deposited on the intake passage forming members.

While the driving force of the electric motor M is utilized for motoring the engine 10 in the illustrated embodiment, the driving force of the starter S may be used for motoring the engine 10.

In the illustrated embodiment, the fuel deposition amount fw(k) that decreases with time during execution of motoring after the point of time when the engine stop condition is established is estimated by using, as the initial value, the fuel deposition amount fw(k+1) calculated by the fuel deposition model at the point of time when the engine stop condition is satisfied, and motoring is stopped when the estimated fuel deposition amount fw(k) becomes substantially equal to zero (i.e., becomes smaller than the reference amount fwref). However, the duration of the motoring may be set to a predetermined period of time T0. In this case, the predetermined time T0 may be set to be equal to or longer than the time required for reducing the fuel deposition amount fw(k) to be substantially equal to zero through motoring even when the fuel deposition amount fw(k) obtained at the point when the engine stop condition is satisfied takes the maximum value that can be conceived.

In the illustrated embodiment, the fuel deposition amount fw(k) that decreases each time a predetermined time elapses during execution of motoring is estimated by using the remaining rate P1 based on the above expression (19). However, the fuel deposition amount fw(k) during motoring may be estimated on the assumption that the amount fw(k) decreases by a predetermined reduction amount Δfw each time a predetermined time elapses. In this case, motoring is stopped at a point of time when the fuel deposition amount fw(k) during execution of motoring becomes equal to zero or a negative value.

In the fuel injection amount control apparatus of the invention, the remaining rate P and the deposition rate R used for calculation of the above expressions (17) and (18) may be identified in the following manner each time the engine 10 is started. More specifically, after an engine start condition is satisfied, the control apparatus stores, in the RAM 73, the history of the fuel injection amount fi(k) and the fuel deposition amount fw(k) both used for calculation of the expression (18), the history of the value KLFWD equivalent to the intake air amount calculated according to the models shown in FIG. 8, and the history of the air/fuel ratio A/F based on the output voltage vabyfs of the air/fuel ratio sensor, over a predetermined period from the point of time when injection of fuel of the fuel injection amount fi(k) is started. Then, the apparatus obtains the history of the actual required fuel injection amount fc1(k) (=(KLFWD/(A/F)) from the history of the value KLFWD equivalent to the intake air amount and the history of the air/fuel ratio A/F, which are stored in the RAM 73, and stores the history of the amount fc1(k) in the RAM 73. Then, the apparatus applies the history of the fuel injection amount fi(k) and the history of the fuel deposition amount fw(k) stored in the RAM 73, to the above-indicated expression (17), and applies the history of the fuel injection amount fi(k), the history of the fuel deposition amount fw(k), and the history of the actual required fuel injection amount fc1(k) stored in the RAM 73, to the above-indicated expression (18). As a result, only the remaining rate P and the deposition rate R remain unknowns in the two expressions (17) and (18), and therefore the apparatus is able to identify the remaining rate P and the deposition rate R.

What is claimed is:

1. A fuel injection amount control apparatus of an internal combustion engine, which is arranged to start injection of a fuel when a certain engine start condition is satisfied, and stop the injection of the fuel when a certain engine stop condition is satisfied, comprising:
   a fuel injecting unit that injects the fuel in an intake passage that is connected to a combustion chamber of the engine;
   a fuel deposition amount estimating unit that estimates a fuel deposition amount that is an amount of fuel deposited on an intake passage forming member that defines the intake passage;
   a fuel injection amount determining unit that determines a fuel injection amount that is an amount of fuel injected from the fuel injecting unit, based on the estimated fuel deposition amount; and
   a particular process executing unit that executes a particular process for making an actual fuel deposition amount on the intake passage forming member substantially equal to zero, after the engine stop condition is satisfied and before the injection of the fuel is started under a condition that the engine start condition is satisfied.

2. The fuel injection amount control apparatus according to claim 1, further comprising a pre-start injection commanding unit that causes the fuel injecting unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

3. The fuel injection amount control apparatus according to claim 1, further comprising:
   a motoring unit capable of executing motoring of the internal combustion engine, wherein
   the particular process executing unit causes the motoring unit to execute motoring of the engine as the particular process.

4. The fuel injection amount control apparatus according to claim 3, wherein:
   the internal combustion engine includes an introduction passage through which a part of an exhaust gas that passes an exhaust passage of the engine is introduced into the intake passage; and
   the particular process executing unit introduces the part of the exhaust gas into the intake passage through the introduction passage when the motoring unit executes motoring of the engine.

5. The fuel injection amount control apparatus according to claim 4, further comprising a pre-start injection commanding unit that causes the fuel injecting unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

6. The fuel injection amount control apparatus according to claim 3, further comprising a pre-start injection commanding unit that causes the fuel injecting unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

7. The fuel injection amount control apparatus according to claim 3, wherein the particular process executing unit causes the motoring unit to execute motoring of the engine immediately after the engine stop condition is satisfied.

8. The fuel injection amount control apparatus according to claim 7, wherein:
   the internal combustion engine includes an introduction passage through which a part of an exhaust gas that passes an exhaust passage of the engine is introduced into the intake passage; and the particular process executing unit introduces the part of the exhaust gas into the intake passage through the introduction passage when the motoring unit executes motoring of the engine.

9. The fuel injection amount control apparatus according to claim 8, further comprising a pre-start injection commanding unit that causes the fuel injecting unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

10. The fuel injection amount control apparatus according to claim 7, further comprising a pre-start injection commanding unit that causes the fuel injecting unit to inject a predetermined amount of fuel prior to a start of the injection of the fuel under the condition that the engine start condition is satisfied, after the actual fuel deposition amount on the intake passage forming member is made substantially equal to zero through the particular process executed by the particular process executing unit.

11. A method of controlling a fuel injection amount of an internal combustion engine, in which injection of a fuel is started when a certain engine start condition is satisfied, and is stopped when a certain engine stop condition is satisfied, comprising the steps of:

injecting the fuel in an intake passage that is connected to a combustion chamber of the engine;

estimating a fuel deposition amount that is an amount of fuel deposited on an intake passage forming member that defines the intake passage;

determining a fuel injection amount that is an amount of fuel injected in the intake passage, based on the estimated fuel deposition amount; and executing a particular process for making an actual fuel deposition amount on the intake passage forming member substantially equal to zero, after the engine stop condition is satisfied and before the injection of the fuel is started under a condition that the engine start condition is satisfied.

12. The method according to claim 11, further comprising the step of injecting a predetermined amount of fuel prior to a start of the injection of the fuel under the condition that the engine start condition is satisfied, after the actual fuel deposition amount on the intake passage forming member is made substantially equal to zero through the particular process.

13. The method according to claim 11, further comprising the step of executing motoring of the internal combustion engine as the particular process.

14. The method according to claim 13, wherein:

the internal combustion engine includes an introduction passage through which a part of an exhaust gas that passes an exhaust passage of the engine is introduced into the intake passage; and the part of the exhaust gas is introduced into the intake passage through the introduction passage when motoring of the engine is executed as the particular process.

15. The method according to claim 14, further comprising the step of injecting a predetermined amount of fuel prior to a start of the injection of the fuel under the condition that the engine start condition is satisfied, after the actual fuel deposition amount on the intake passage forming member is made substantially equal to zero through the particular process.

16. The method according to claim 13, further comprising the step of injecting a predetermined amount of fuel prior to a start of the injection of the fuel under the condition that the engine start condition is satisfied, after the actual fuel deposition amount on the intake passage forming member is made substantially equal to zero through the particular process.

17. The method according to claim 13, wherein motoring of the engine is executed as the particular process immediately after the engine stop condition is satisfied.

18. The method according to claim 17, wherein:

the internal combustion engine includes an introduction passage through which a part of an exhaust gas that passes an exhaust passage of the engine is introduced into the intake passage; and the part of the exhaust gas is introduced into the intake passage through the introduction passage when motoring of the engine is executed as the particular process.

19. The method according to claim 18, further comprising the step of injecting a predetermined amount of fuel prior to a start of the injection of the fuel under the condition that the engine start condition is satisfied, after the actual fuel deposition amount on the intake passage forming member is made substantially equal to zero through the particular process.

20. The method according to claim 17, further comprising the step of injecting a predetermined amount of fuel prior to a start of the injection of the fuel under the condition that the engine start condition is satisfied, after the actual fuel deposition amount on the intake passage forming member is made substantially equal to zero through the particular process.

* * * * *